US012265855B2

(12) United States Patent
Alagna et al.

(10) Patent No.: US 12,265,855 B2
(45) Date of Patent: Apr. 1, 2025

(54) INFRASTRUCTURE FOR DEPLOYING A SECURITY INFORMATION AND EVENT MANAGEMENT APPLICATION ON A CONTAINER PLATFORM

(71) Applicant: Hewlett Packard Enterprise Development LP, Houston, TX (US)

(72) Inventors: Elias S. Alagna, San Jose, CA (US); Christopher Michael Crawford, Hoover, AL (US); Swami Viswanathan, Santa Clara, CA (US); Richard B. Peterson, Tustin, CA (US); Rohan Jayaraj, Santa Clara, CA (US); Randy Thomasson, Ilwaco, WA (US); Alok Daipuria, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 59 days.

(21) Appl. No.: 17/811,628

(22) Filed: Jul. 11, 2022

(65) Prior Publication Data

US 2022/0342707 A1 Oct. 27, 2022

Related U.S. Application Data

(63) Continuation-in-part of application No. 17/074,526, filed on Oct. 19, 2020, now Pat. No. 11,388,234.

(51) Int. Cl.
*G06F 9/50* (2006.01)
(52) U.S. Cl.
CPC ................... *G06F 9/505* (2013.01)

(58) Field of Classification Search
CPC ....................................................... G06F 9/505
See application file for complete search history.

(56) References Cited

U.S. PATENT DOCUMENTS 9,830,175 B1 * 11/2017 Wagner ................ G06F 9/5027
10,083,057 B1    9/2018 Currie et al.
(Continued)

OTHER PUBLICATIONS

Ali et al., "Container Storage Interface (CSI) for Kubernetes GA", Kubernetes, available online at <https://kubernetes.io/blog/2019/01/15/container-storage-interface-ga/>, Jan. 15, 2019, 6 pages.
(Continued)

*Primary Examiner* — Douglas B Blair
(74) *Attorney, Agent, or Firm* — Slater Matsil, LLP

(57) ABSTRACT

Embodiments described herein are generally directed to a containerized application software deployment architecture. According to an example, a system includes multiple hosts that are part of aa stretch cluster spanning multiple data centers. Each of the hosts include a processing resource, a memory, and a storage device. Each host of a first subset of the multiple hosts runs multiple containerized instances of a component of a Security Information and Event Management (SIEM) application within respective containers. At least one host of the multiple hosts is separate from the first subset and is dedicated to running at least one containerized ingress gateway application operable to load balance requests directed to the SIEM application among the multiple containerized instances running on the first subset of hosts.

9 Claims, 15 Drawing Sheets

(56) References Cited

U.S. PATENT DOCUMENTS

| | | | | |
|---|---|---|---|---|
| 10,567,288 | B1* | 2/2020 | Mutnuru | H04L 41/40 |
| 10,812,366 | B1 | 10/2020 | Berenberg et al. | |
| 11,237,813 | B1* | 2/2022 | Chen | G06F 8/61 |
| 11,388,234 | B2* | 7/2022 | Alagna | G06F 9/45558 |
| 11,449,280 | B1* | 9/2022 | Dhuse | G06F 11/1004 |
| 12,010,186 | B2* | 6/2024 | Yang | H04L 63/168 |
| 12,079,255 | B1* | 9/2024 | Patel | G06F 16/328 |
| 12,169,652 | B2* | 12/2024 | Dhuse | G06F 11/1088 |
| 2013/0212240 | A1* | 8/2013 | Thornewell | H04L 61/4511 |
| | | | | 709/223 |
| 2014/0068611 | A1 | 3/2014 | McGrath et al. | |
| 2014/0092906 | A1* | 4/2014 | Kandaswamy | H04L 45/38 |
| | | | | 370/392 |
| 2015/0220080 | A1 | 8/2015 | Nixon et al. | |
| 2016/0321352 | A1* | 11/2016 | Patel | G06F 16/328 |
| 2017/0126469 | A1 | 5/2017 | Liang et al. | |
| 2018/0096979 | A1 | 4/2018 | Pappu et al. | |
| 2018/0137174 | A1 | 5/2018 | Cahana et al. | |
| 2018/0218045 | A1 | 8/2018 | Pal et al. | |
| 2018/0287891 | A1* | 10/2018 | Shaw | H04W 24/02 |
| 2018/0367609 | A1* | 12/2018 | Ozkan | H04L 67/63 |
| 2019/0052532 | A1 | 2/2019 | Chen et al. | |
| 2019/0199540 | A1* | 6/2019 | Robitzsch | H04L 12/189 |
| 2019/0354637 | A1 | 11/2019 | Ivancich et al. | |
| 2020/0097204 | A1 | 3/2020 | Sato et al. | |
| 2020/0314173 | A1 | 10/2020 | Pahwa et al. | |
| 2021/0067489 | A1* | 3/2021 | Jayawardena | H04L 67/1097 |
| 2022/0004381 | A1 | 1/2022 | Myers et al. | |
| 2022/0191168 | A1* | 6/2022 | Snehashis | H04L 41/22 |
| 2022/0357995 | A1* | 11/2022 | Moussaoui | G06F 9/5033 |
| 2022/0374267 | A1* | 11/2022 | Katyal | G06F 9/505 |
| 2022/0385735 | A1* | 12/2022 | Yang | H04W 12/069 |
| 2023/0305876 | A1* | 9/2023 | Sharma | G06F 11/0793 |

OTHER PUBLICATIONS

Edureka, "Splunk Architecture: Tutorial on Forwarder, Indexer and Search Head", available online at <https://web.archive.org/web/20191113013802/https://www.edureka.co/blog/splunk-architecture/>, May 22, 2019, 8 pages.

Hewlett Packard Enterprise, "HPE Ezmeral Container Platform", Aug. 3, 2020, 15 pages.

Hewlett Packard Enterprise, "HPE ProLiant DL380 Gen10 Server", Oct. 1, 2020, 95 pages.

Hewlett Packard Enterprise, "HPE Scalable Object Storage with Scality Ring", Solution brief, Jun. 2019, Rev. 4, 2 pages.

Intel, "Introducing Intel (Registered) QLC 3D NAND Technology", Solution Brief, Sep. 2019, 4 pages.

Istio, "The Istio Service Mesh", available online at <https://istio.io/v1.6/docs/concepts/what-is-istio/>, Aug. 21, 2020, 4 pages.

Istio, "Traffic Management", available online at <https://web.archive.org/web/20200810084914/https://istio.io/latest/docs/concepts/traffic-management/>, Aug. 10, 2020, 15 pages.

OpenEBS Docs, "Container Attached Storage (CAS)", available online at <https://web.archive.org/web/20200815140026/https://docs.openebs.io/docs/next/cas.html>, Aug. 15, 2020, 5 pages.

OpenEBS Docs, "Welcome to OpenEBS Documentation", available online at <https://web.archive.org/web/20190330081311/https://docs.openebs.io/>, Mar. 30, 2019, 3 pages.

Splunk, "About search head clustering", available online at <https://docs.splunk.com/Documentation/Splunk/8.1.0/DistSearch/AboutSHC#>, Sep. 23, 2015, 2 pages.

Splunk, "An Insider's Guide to Splunk on Containers and Kubernetes", available online at <https://www.splunk.com/en_us/blog/it/an-insiders-guide-to-splunk-on-containers-and-kubernetes.html>, May 8, 2019, 6 pages.

Splunk, "Indexer", available online at <https://web.archive.org/web/20181119231629/http://docs.splunk.com/Splexicon:Indexer>, Nov. 29, 2018, 12 pages.

Splunk, "Indexes, indexers, and indexer clusters", available online at <https://web.archive.org/web/20201129083259/https://docs.splunk.com/Documentation/Splunk/8.1.0/Indexer/Aboutindexesandindexers>, Sep. 3, 2020, 4 pages.

Splunk, "Introducing the Splunk Operator for Kubernetes", available online at <https://www.splunk.com/en_us/blog/platform/introducing-the-splunk-operator-for-kubernetes.html>, Nov. 22, 2019, 3 pages.

Splunk, "Multisite indexer cluster architecture", available online at <https://web.archive.org/web/20201129083809/https://docs.splunk.com/Documentation/Splunk/8.1.0/Indexer/Multisitearchitecture>, Oct. 15, 2020, 5 pages.

Splunk, "Search head clustering architecture", available online at <https://web.archive.org/web/20201202103305/https://docs.splunk.com/Documentation/Splunk/8.1.0/DistSearch/SHCarchitecture>, Oct. 16, 2020, 7 Pages.

Splunk, "Search Head", available online at <https://web.archive.org/web/20180202113300/https://docs.splunk.com/Splexicon:Searchhead>, Feb. 2, 2018, 12 pages.

* cited by examiner

INFRASTRUCTURE FOR DEPLOYING A SECURITY INFORMATION AND EVENT MANAGEMENT APPLICATION ON A CONTAINER PLATFORM

CROSS-REFERENCE TO RELATED APPLICATIONS

This application is a continuation application of and claims priority to application Ser. No. 17/074,526, filed on Oct. 19, 2020, the contents of which are hereby incorporated by reference in their entireties.

BACKGROUND

Exponential data growth from increased infrastructure, application and network traffic have outpaced the ability of security solutions to effectively leverage this data to detect, alert, and prevent security events. As data rates exceed an organization's ability to index, store, and analyze the data, it is estimated that nearly half of this security-related digital exhaust is not even being utilized in security analytics because the data simply cannot be ingested and processed in a timely manner. Consequently, there are significant blind spots in Information Technology (IT) security and operations.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
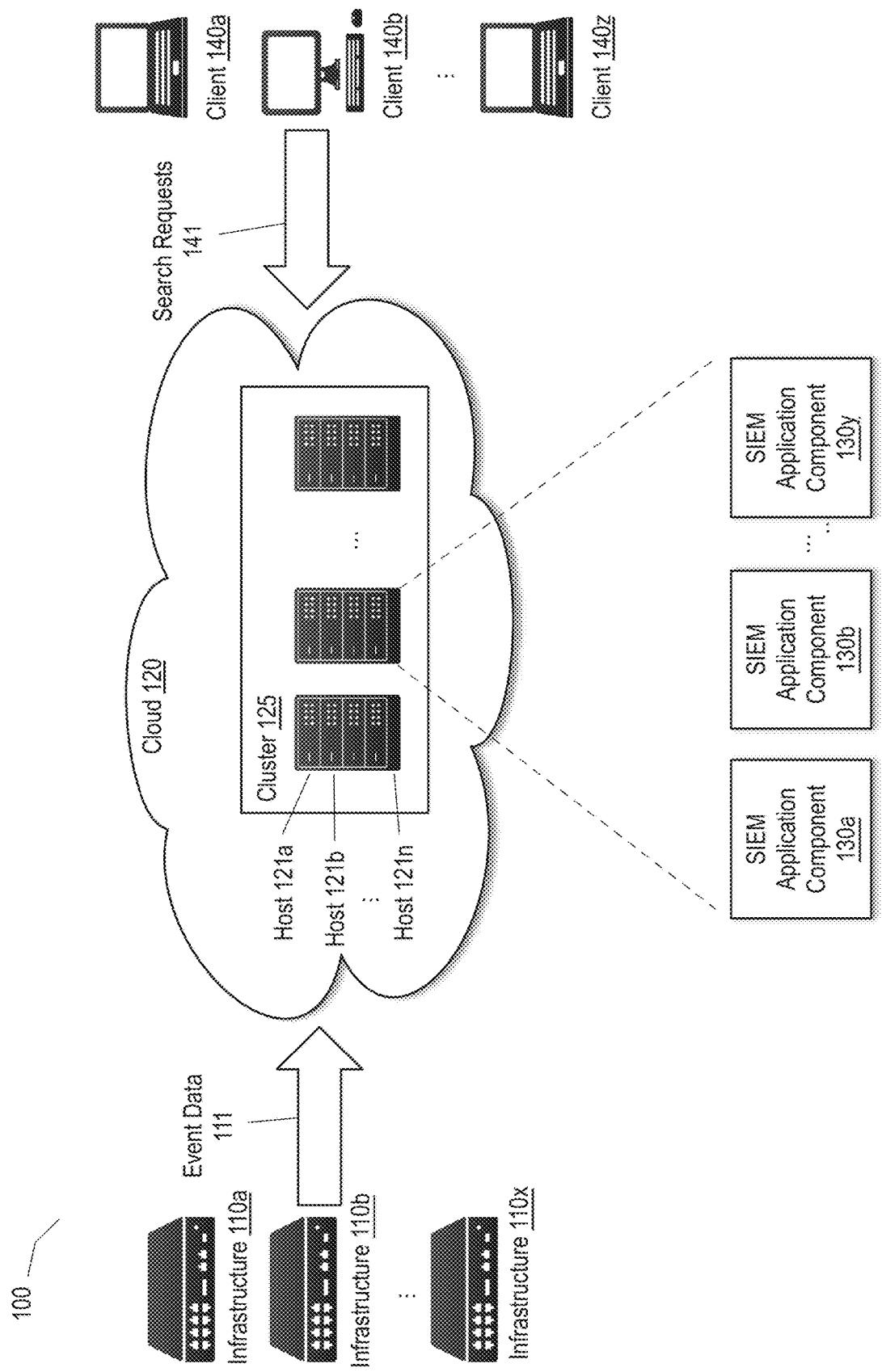
FIG. 1 shows a high-level block diagram illustrating interactions between external actors and a cluster in accordance with an example.

Embodiments described herein are generally directed to a containerized application software deployment architecture. Numerous specific details are set forth in order to provide a thorough understanding of exemplary embodiments. It will be apparent, however, to one skilled in the art that embodiments described herein may be practiced without some of these specific details.

At present, oversized systems, potentially including hundreds or even thousands of commodity servers, are used to accommodate for, among other things, various limitations and lack of sophistication of legacy infrastructure and application developers. For example, neither the resources (e.g., processing, memory, or storage) of the hardware platforms used nor the legacy infrastructure architecture typically employed are optimized for a specialized purpose, such as the high rates of data ingestion demanded by large volume data analytics applications (e.g., Security Information and Event Management (SIEM) applications). Additionally, despite the growing popularity and increased usage of container orchestration engines (e.g., Kubernetes®, Google Kubernetes Engine (GKE), Amazon Elastic Kubernetes Service (EKS), and Microsoft Azure Kubernetes Service (AKS)), avoidance of the complexities associated with packing or stacking multiple instances of application components on hardware platforms and instead relying on a simplistic containerization approach of one application instance per container per physical or virtual machine results in the underutilization of these oversized systems as well as excessive infrastructure bloat.

Even in high-end SIEM application deployments, event data ingestion rates may be currently measured in the range of 100-500 gigabyte (GB) per host per day (i.e., "day" may refer to a 24-hour period), but still operate at relatively low Central Processing Unit (CPU) utilization, thereby requiring massive over-deployments of infrastructure to keep pace with data growth. This excessive infrastructure bloat means data centers are bursting at the seams as IT support teams struggle to scale-out ingestion, processing, storage, and analysis of event data. The increased infrastructure and management costs associated therewith coupled with the growing backlog of data and security insights is creating an urgent need to find ways to optimize delivery and consumption of big data analytics.

As described further below, in embodiments, a system is provided including a cloud having multiple hosts that are part of a stretch cluster spanning multiple data centers. Each host of a first subset of the hosts may be operable to run multiple instances of a component of a Security Information and Event Management (SIEM) application, such as an indexer, within respective containers. External sources may send requests to the SIEM application, and at least one host in each data center may be dedicated to running a containerized gateway application that load balances those requests among the first subset of hosts.

Embodiments described here seek to achieve a right-sized infrastructure deployment for a SIEM application while also addressing various restraints on data ingestion rates. Exemplary systems and methods may thus remove bottlenecks on SIEM application performance and enable significantly improved performance, including improvements in metrics such as ingestion rates. For example, in one embodiment, running at least two containerized instances of an indexing component of a SIEM application on a host may increase event data ingestion rates to at least 1 TB per host per day. Furthermore, the ingestion rate may increase as a function of the number of instances of the containerized SIEM application component, until one or more system resources (e.g., processing resources, memory, storage I/O, or network I/O) are saturated.

To achieve such performance increases, various embodiments may, for example and among other things, optimize the configuration of processing, memory, and storage resources of a host (i.e., a server) so that multiple instances of containerized SIEM application components may be packed on the host and run efficiently and performantly. Additionally, exemplary systems described here may run ingress gateways (implementing service mesh functionality) on dedicated hosts, which may beneficially provide highly available traffic routing even in the presence of large amounts of traffic. Moreover, exemplary systems may manage complex storage configurations the SIEM application, including flexibly configuring storage based on the roles of cluster nodes and providing object storage for warm buckets of indexed data.

TERMINOLOGY

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not necessarily required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, the phrase "Security Information and Event Management application" or "SIEM application" refers to a set of tools and/or services that consolidate data from numerous sources. A SIEM application may collect and aggregate large volume machine-generated data (e.g., log data generated throughout an organization's technology infrastructure), for example, from host systems, IT systems, and applications to network devices and network security devices (e.g., firewalls, Intrusion Detection Systems (IDSs), Intrusion Prevention Systems (IPSs), Virtual Private Network (VPN) appliances/gateways, Unified Threat Management (UTM) appliances, Web Application Firewalls (WAFs), Network Access Control (NAC) servers, antivirus filters, and the like). A SIEM application may additionally facilitate presentation of a holistic view of an organization's information security and provide real-time visibility across an organization's information security systems. Non-limiting examples of a SIEM application include Splunk® Enterprise produced by Splunk Inc.; Security Event Manager produced by SolarWinds Worldwide, LLC; ArcSight® Enterprise Security Manager produced by Micro Focus International plc, IBM® QRadar® SIEM produced by International Business Machines Corporation, and LogRhythm NextGen SIEM Platform produced by LogRhythm, Inc.

As used herein, the phrase "event data" is intended to broadly refer to any type of information regarding activities that have taken place on or are otherwise observed by or on one or more computer systems or applications. Such information is typically stored in a log file of some kind. Almost all IT systems and applications generate log files. Theses logs may serve as a record of the activity that the system conducted in its operation. Such logs can be generated by network infrastructure devices (firewalls, switches, domain name service devices, routers, load balancers), computer platforms (servers, appliances, and smartphones), operating systems and applications (client/server, web applications, cloud-based utilities). In the context of an endpoint system, a system log file may contain events that are logged by the operating system components. These events may be predetermined by the operating system itself or customized by an administrator. System log files may contain information about device changes, device drivers, system changes, events, operations and more. In the context of an application, a network log may refer to a file that contains a record of events that occurred in the application. The network log may contain the record of user and process access calls to objects, attempts at authentication, and other activity. In various embodiments described herein a log forwarder (e.g., in the form of an agent running on the monitored system or a process or system external to the monitored system) may collect the information stored in various types of logs and forward it along for parsing, indexing, storage and/or analysis by another system (e.g., a SIEM application).

As used herein, the phrase "large volume" when used to describe machine-generated data refers to data generated by and/or for a SIEM application. Such large volume machine-generated data may be generated at gigabytes (GBs) of data per second or terabytes (TBs) of data per day. For example, in some embodiments, over 500 megabytes (MB) and preferably on the order of approximately between 1 and 3 GBs of machine-generated data may be ingested, indexed, and stored by a single instance of an indexer component of a containerized SIEM application per second and over 8 TBs of machine-generated data may be ingested, indexed, and stored per host (running multiple indexer instances) per day.

As used herein, the phrase "supporting role component" refers to a component or node that supports or otherwise coordinates the activities of worker nodes and/or performs management services that may need to persist state and/or configuration information, for example, to facilitate failure recovery. A non-limiting example of a supporting role component in the context of Kubernetes® is a Kubernetes® cluster master. A worker role, on the other hand, may refer to a component or node performing processing activities of an application, and more particularly in the context of the present disclosure, may refer to indexer and searcher applications/components of a SIEM application for example. Non-limiting examples of a supporting role component in the context of a SIEM application (e.g., Splunk® Enterprise) include search head cluster master nodes and index cluster master nodes.

Reference in the specification to "one embodiment" or "an embodiment" means that a particular feature, structure, or characteristic described in connection with the embodiment can be included in at least one embodiment of the invention. The appearances of the phrase "in one embodiment" are not necessarily all referring to the same embodiment.

FIG. 1 shows a high-level block diagram of system 100, illustrating interactions between external actors and cluster 125 in accordance with an example embodiment. In the context of the present example, infrastructure 110a-x produce large volume, machine-generated data (e.g., event data 111) that is forwarded to a containerized SIEM application (e.g., shown in the form of SIEM application components 130a-y) running on cluster 125 deployed within cloud 120. Depending upon the particular implementation, infrastructure 110a-x may represent one or more host systems, IT systems, network devices and/or network security devices of an organization's technology infrastructure. After processing (e.g., indexing) of event data 111 by the SIEM application, the data may then be made available for access by client systems (e.g., client 140a-z). For example, the client systems may issue search requests 141 to the SIEM application.

As described further below with reference to FIG. 2, cloud 120 may be a private cloud. The private cloud may include on-premise enterprise data centers owned and operated by the organization. Additionally or alternatively, the private cloud may include managed private cloud data center equipment owned, provided, and managed by a vendor, a cloud provider, or a managed services provider and located at the organization's data center or a colocation, and the organization may use and pay for the managed private cloud on a consumption or subscription basis. Thus, such a managed private cloud may provide a public cloud-like experience to the organization.

In the context of the present example, cloud 120 includes cluster 125, which is comprised of multiple hosts (e.g., host 121a-n). In various examples described herein, each host may include at least one processing resource (e.g., a CPU, a Graphics Processing Unit, a microcontroller, a microprocessor, an application-specific integrated circuit (ASIC), a field programmable gate array (FPGA), etc.), a memory resource (e.g., random access memory (RAM), read-only memory (ROM), electrically erasable programmable read-only memory (EEPROM), etc.), and a storage resource (e.g., a storage device such as a hard disk drive, a solid state drive, flash memory, etc.). The storage resource may utilize the Non-Volatile Memory express (NVMe) protocol. For example, a host may be a compute appliance or server. A subset of hosts 121 may each be operable to run multiple instances of SIEM application components (e.g., SIEM application components 130a-y). Depending upon the particular SIEM application, SIEM application components 130 may be operable to perform indexing functionality and/or searching functionality. The multiple instances running on a particular host may be limited to a single type of SIEM application component or may include multiple types of SIEM application components.

A non-limiting example of an architecture on which a containerized SIEM application may be deployed is described further below with reference to FIG. 2.

Figure 2:
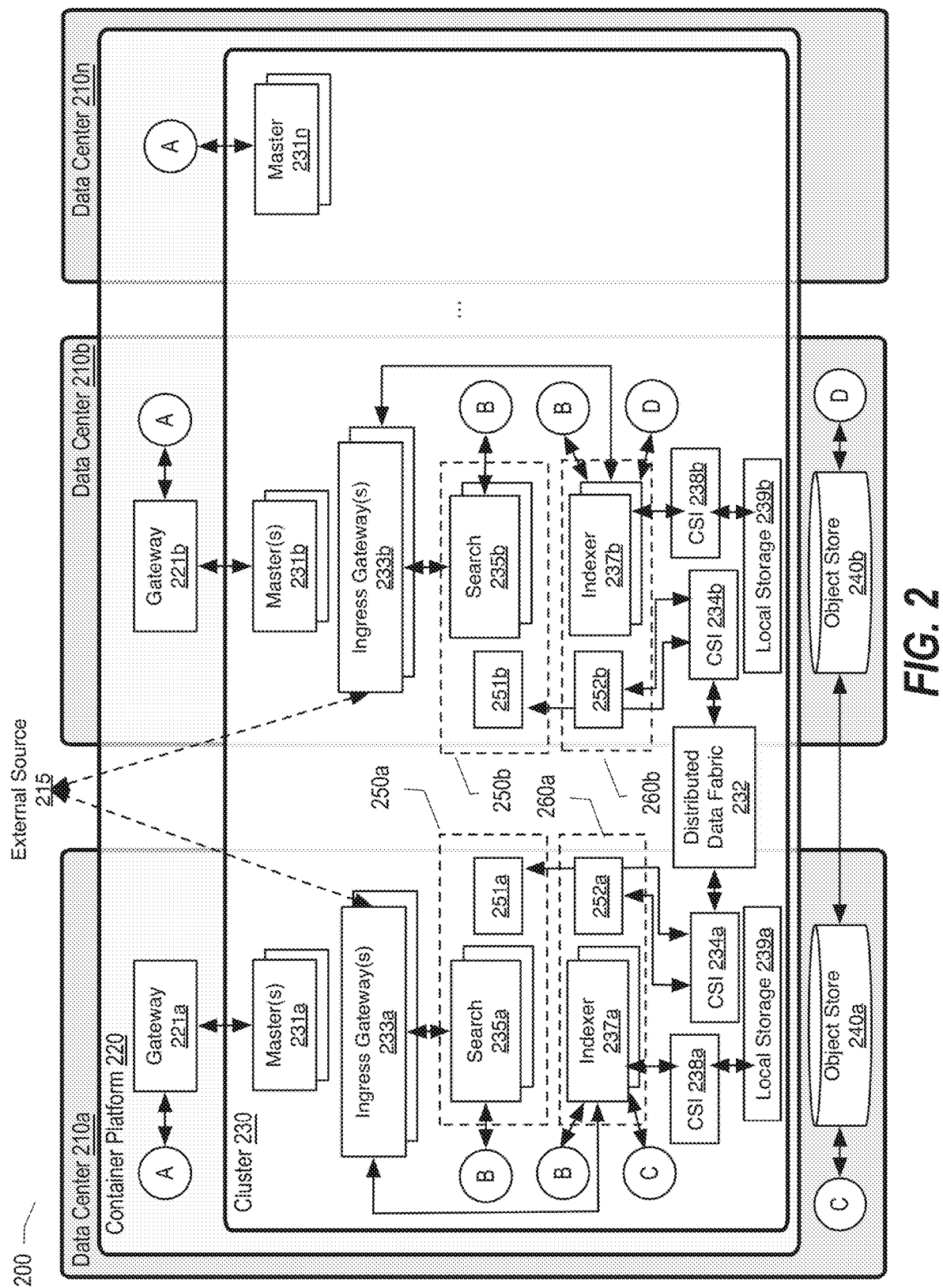
FIG. 2 shows a block diagram illustrating an exemplary architecture for containerized application software deployment.

FIG. 2 is a block diagram illustrating architecture 200 for containerized application software deployment in accordance with an example embodiment. In one embodiment, architecture 200 is designed for resiliency and the ability to maintain operations through various types of failures (e.g., a site failure, a control plane controller failure, failure of a control plane gateway, failure of a supporting role component (such as a Kubernetes® master node or cluster master), and the like).

In the context of the present example, architecture 200 may include multiple sites (e.g., data centers 210a-n). Data centers 210a-n may include one or more production sites and one or more non-production sites. A production site may be a data center that processes large volume machine-generated data, in contrast to a non-production site that may be used for quorum witness during failover of cluster 230, cloud management, or other backend processes. For example, data centers 210a-b may serve as production sites and data center 210n may serve as a non-production site. The data centers 210a-n may be geographically separated, on-premise enterprise data centers (e.g., built, owned, and/or operated by the organization) or some portion of the infrastructure and equipment may be leased from and managed by a third party (e.g., a vendor, a cloud provider, or managed service provider) on behalf of the organization. In some embodiments, one or more of the data centers 210a-n may be colocation data centers in which the enterprise rents space within data centers that are located off premises and owned by one or more third parties.

In one embodiment, container platform 220 (e.g., HPE Ezmeral Container Platform produced by Hewlett Packard Enterprise Company) may be deployed within data centers 210a-n in which cluster 230 (e.g., a Kubernetes® cluster, representing a non-limiting example of cluster 125), including multiple hosts (e.g., hosts 121a-n) may be established for running and orchestrating a containerized SIEM application. Generally, container technology is a computing virtualization paradigm where an application is packaged together with dependencies and libraries in a container to provide an isolated environment for running the application. Such an application may be referred to as a containerized application. Many containers (in pods) can run on top of a single operating system, but each container is inherently isolated from other containers. In this manner, the container paradigm may be understood to virtualize the operating system. Containers may be more lightweight than other forms of virtualization such as virtual machines, which virtualize hardware. For example, each virtual machine may have its own copy of an operating system kernel, while by contrast, multiple containers may share an operating system kernel.

In some implementations, container platform 220 orchestrates running containers of the SIEM application directly on bare metal, that is, directly on the host hardware without running the containers within virtual machines running on a hypervisor that runs on the host bare metal hardware. In other implementations, container platform 220 orchestrates running containers of the SIEM application in virtual machines. Cluster 230 may be a stretch cluster spanning data centers 210a-n in which the multiple hosts are geographically separated and distributed across data centers 210a-n. In the context of the present example, data centers 210a-n may include additional equipment, infrastructure and hosts (e.g., separate and apart from hosts 121a-n of cluster 230) to support container platform 220 and object stores (e.g., object stores 240a-b).

In addition to providing and supporting core capabilities of a container orchestration engine (e.g., Kubernetes®), container platform 220 may implement a control plane including control plane gateways (e.g., gateway 221a-b). Gateways 221a-b may be used by a managed service provider in connection with deployment and monitoring of container platform 220 and cluster 230. Those skilled in the art will appreciate, depending upon the particular implementation, various other services (e.g., authentication, tenant management, user role management, Domain Name Service (DNS), and the like) may be provided by container platform 220.

Returning to cluster 230, in the context of the present example, cluster 230 is shown including multiple supporting role components (e.g., masters 231a-n), multiple ingress gateways 233a-b, multiple search applications 235a-b (also referred to as search components of a SIEM application, and potentially grouped into respective search head clusters 250a-b and including respective search head cluster masters 251a-b), multiple indexer applications 237a-b (also referred to as indexer components of a SIEM application, and potentially grouped into respective indexer clusters 260a-b and including respective indexer cluster masters 252*a-b*), distributed data fabric 232, multiple types of Container Storage Interface (CSI) drivers (e.g. CSI 238*a-b* and CSI 234*a-b*) and local storage 239*a-b*. As described further below, the multiple supporting role components may have storage needs different from nodes operating in worker roles, which may be addressed by flexibly configuring storage during provisioning.

With respect to the ingress gateways, it is noted, as a result of the straightforward and simplistic approach taken by traditional SIEM application deployments in which a single instance of a component of the SIEM application is deployed per physical or virtual machine, ingress gateways are not typically included within such traditional SIEM application deployments. Instead, external communications may be directed specifically to those single instances. In contrast, in various embodiments described herein, the service mesh functionality provided by the ingress gateway can facilitate routing of requests to appropriate instances of the multiple instances of containerized applications that may now efficiently run on each of one or more physical or virtual machines, in which appropriate amounts of processing, memory, and storage resources are specifically optimized for the workload characteristics of the SIEM application.

According to one embodiment, at least one ingress gateway 233*a-b* is deployed in each production site (e.g., data center 210*a* and data center 210*b*). Each ingress gateway 233*a-b* may run within dedicated pods on a dedicated host to serve the role of a network-ingress point into cluster 230. In an embodiment, it may be understood herein that pods and hosts are "dedicated" to running an ingress gateway in that those pods and hosts do not run or are precluded from running at least any workloads related to the SIEM application.

While gateways traditionally process North-South traffic (e.g., client-to-server traffic that moves into a data center from a location outside of the data center), in some embodiments described herein, various functionality of ingress gateways 233*a-b* may also play a role in the handling of East-West traffic (e.g., traffic flow within the data center). As such, ingress gateways 233*a-b* may also be referred to herein individually as a service mesh or collectively as service meshes.

As explained further below, ingress gateways 233*a-b* may be exposed on ports of the respective hosts on which they run. In addition to acting as a network-ingress point into cluster 230, ingress gateway 233*a-b* may also operate as a service mesh offering a number of features, including proxy networks called sidecars, policy management, telemetry and metric collection, and tracing. Ingress gateways 233*a-b* may perform a number of functions including, among others, discovery of virtual services within cluster 230, operating as a firewall on behalf of cluster 230, and performing traffic routing and/or load balancing within cluster 230.

Ingress gateways 233*a-b* may be responsible for guarding and controlling access to cluster 230 from traffic that originates outside of cluster 230 from external source 215. External source 215 may be a SIEM user issuing a search request via client 140*a-x* or monitored infrastructure (e.g., infrastructure 110*a-x*) providing event data (e.g., event data 111). With respect to monitored infrastructure, the event data may be provided directly by the monitored infrastructure or indirectly by an intermediate entity (e.g., a forwarder that may monitor log data and forward as appropriate). When traffic is accepted by one of ingress gateways 233*a-b* from external source 215, it may further handle, among other things, routing and balancing of the ingress request to appropriate SIEM application component instances (e.g., indexer applications 237*a-b* or search applications 235*a-b*) within the cluster 230.

Advantageously, by dedicating a host to each of ingress gateways 233*a-b*, routing of event data (e.g., event data 111) to indexer applications 237*a-b* may avoid being impacted by other unrelated processing (e.g., computational workloads, such as SIEM application workloads) that might otherwise be scheduled by the container orchestration engine to be performed concurrently on the host. As described in further detail below with reference to FIGS. 7 and 9, the routing and load balancing of HTTP and/or TCP traffic received by a particular ingress gateway 233 may involve locality-based load balancing, for example, to process requests received by the particular ingress gateway 233 within the same data center 210 in which the particular ingress gateway 233 resides. Non-limiting examples of commercial products that may be used to implement various functionality of ingress gateway 233 include an Istio gateway and Avi Networks Universal Service Mesh.

In the context of the present example, cluster 230 runs a containerized SIEM application that may include multiple peer application components (e.g., search applications 235*a-b* and indexer applications 237*a-b*) distributed across the production sites. Search applications 235*a-b* (e.g., Splunk Enterprise search heads) may be grouped into a set of networked search heads (e.g., search head cluster 250*a-b*) that serve as a central resource for searching. Indexer applications 237*a-b* (e.g., Spunk Enterprise indexers) may also be grouped into a set of networked indexers (e.g., indexer clusters 260*a-b*) responsible for creating and managing indexes as well as searching the indexed data at the direction of a search head. For example, search application 235 to which a search is assigned may coordinate searches across a set of one or more of indexer applications 237*a-b*. Non-limiting examples of the benefits of this type of clustering/grouping include horizontal scaling, high availability, and avoidance of a single point of failure. For example, as the number of SIEM users and the search load increases, additional search heads may be added. Similarly, as the search load and/or the indexing load increases, additional indexers may be independently added.

In one embodiment, the members of a particular group of peer SIEM application components may be interchangeable, thereby allowing the same searches, the same dashboards, and/or the same search results to be accessed by SIEM users from any member of the group. This interchangeability/resiliency may be supported, for example, as a result of index replication performed by the indexer applications 237*a-b*. For example, by maintaining multiple, identical copies of data, indexer clusters mitigate against data loss while also promoting availability for searching. Additionally, indexer clusters 260*a-b* may feature automatic failover from one indexer application 237 to the next. As a result, if one or more indexer applications 237*a-b* fail, incoming data may continue to be indexed and the indexed data continues to be available for searching. In one embodiment, in order to avoid search processing from interfering with indexing, one or more hosts in each data center 210*a-b* may be dedicated to running indexer clusters and be precluded from scheduling of other types of pods. In other examples, a mix of instances of search applications 235*a-b* and instances of indexer applications 237*a-b* may be run on the same host. Those skilled in the art will appreciate there are a number of other applications that may be associated with the SIEM application, including, among others, a license manager.

As noted above, multiple types of CSI drivers (i.e., CSI 238a-b and CSI 234a-b) may be provided to address the differing storage needs of disparate types of components or roles (e.g., a worker role component versus a supporting role component). For example, it may be desirable to ensure data relating to an indexer application is maintained locally to enhance the speed and efficiency of indexing operations, whereas the proximity of state and/or configuration data that may be persisted by supporting role components is of less consequence. CSI is a standard for exposing storage systems to containerized workloads on container orchestration engines, like Kubernetes®. With the adoption of CSI, the Kubernetes® volume layer becomes extensible. For example, using CSI, third-party storage providers can write and deploy plugins exposing new storage systems in Kubernetes® without modifying the core Kubernetes® code.

In the context of the present example, at least one of CSIs 238a-b is deployed on the appropriate hosts at each site and represents an interface through which respective indexer applications 237a-b store data (e.g., indexes) to local storage 239a-b. This process of storing new data by indexer applications 237a-b may be referred to as ingesting data. In one embodiment, data stored by indexer applications is stored to a Kubernetes® or Docker® volume. In another embodiment, data stored by indexer applications 237a-b is stored in a Docker® container file system (e.g., /var/lib/docker/volumes/). In Kubernetes®, a volume is essentially a directory accessible to all containers running in a pod in which the data in the directory may be preserved across container restarts. A Kubernetes® volume has an explicit lifetime, which is the same as the pod that encloses it. Consequently, a Kubernetes® volume outlives any containers that run within the pod, and data is preserved across container restarts. In contrast, in Docker®, a volume may refer to a directory on disk or in another container and the container's file system lives only as long as the container does. So, when a container terminates and restarts, filesystem changes are lost.

According to one embodiment, CSIs 238a-b access local persistent volumes (PVs) on a local drive (e.g., indexer 237a uses CSI driver 238a to access local storage 239a of the host on which indexer application 237a at issue is running) via Internet Small Computer Systems Interface (iSCSI) and make use of a storage layer (e.g., OpenEBS and Rook, projects of the Cloud Native Computing Foundation) to facilitate dynamic allocation and destruction of volumes. As discussed further below, in some embodiments, local storage 239a-b is comprised of multiple Non-Volatile Memory Express (NVMe) solid state drives (SSDs).

In the context of the present example, at least one of CSIs 234a-b may be deployed in each site and represents an interface to distributed data fabric 232, which may provide for persistent container storage and shared global storage. For example, the respective SIEM application cluster masters (e.g., search head cluster masters 251a-b and indexer cluster masters 252a-b) may store persistent data (e.g., state and/or configuration data that may be used, for among other things, failure recovery) to distributed data fabric 232. According to one embodiment, CSIs 234a-b represent Network File System (NFS) loopback drivers through which distributed data fabric 232 may be accessed. In alternative embodiments, CSIs 234a-b may employ versions of NFS, like NFSv3 or NFSv4.

A non-limiting example of distributed data fabric 232 may include the HPE Ezmeral Data Fabric produced by Hewlett Packard Enterprise Company.

Turning now to object stores 240a-b, in the present example, they are external to cluster 230. In some implementations, cluster 230 has no knowledge regarding the existence of object stores 240a-b. In one embodiment, indexer clusters 236a-b make use of object stores 240a-b to store warm buckets of indexed data (which may be deemed previously indexed data or older data). As described in further detail below with reference to FIG. 8, when the locally stored indexed data reaches a predetermined or configurable threshold, the previously indexed data may be moved to particular object store 240. In one embodiment, object stores 240a-b may be another (or second) plurality of hosts, separate from the hosts running SIEM application indexers or search head clusters for example. Object stores 240a-b may implement the Amazon Simple Storage Service (S3) protocol and asynchronously replicate to each other. Depending upon the particular implementation, object stores 240a-b may each represent a software-defined-storage solution (e.g., a storage system with Scality RING™ produced by Scality, Inc.).

While in the context of the present example, three data centers are shown, those skilled in the art will appreciate the foregoing architecture may be scaled beyond three data centers or may use different numbers or arrangements of data centers. It is further to be understood that the foregoing architecture may be implemented in a public cloud as well, where data centers similar to data centers 210a-c are owned and operated by a public cloud vendor. In such an implementation, hosts (e.g., 121a-n) may be virtual machines and data centers 210a-c may be provided with or without a container environment, similar to container platform 220, to the organization as Infrastructure-as-a-Service, Platform-as-a-Service, or Software-as-a-Service.

Figure 3:
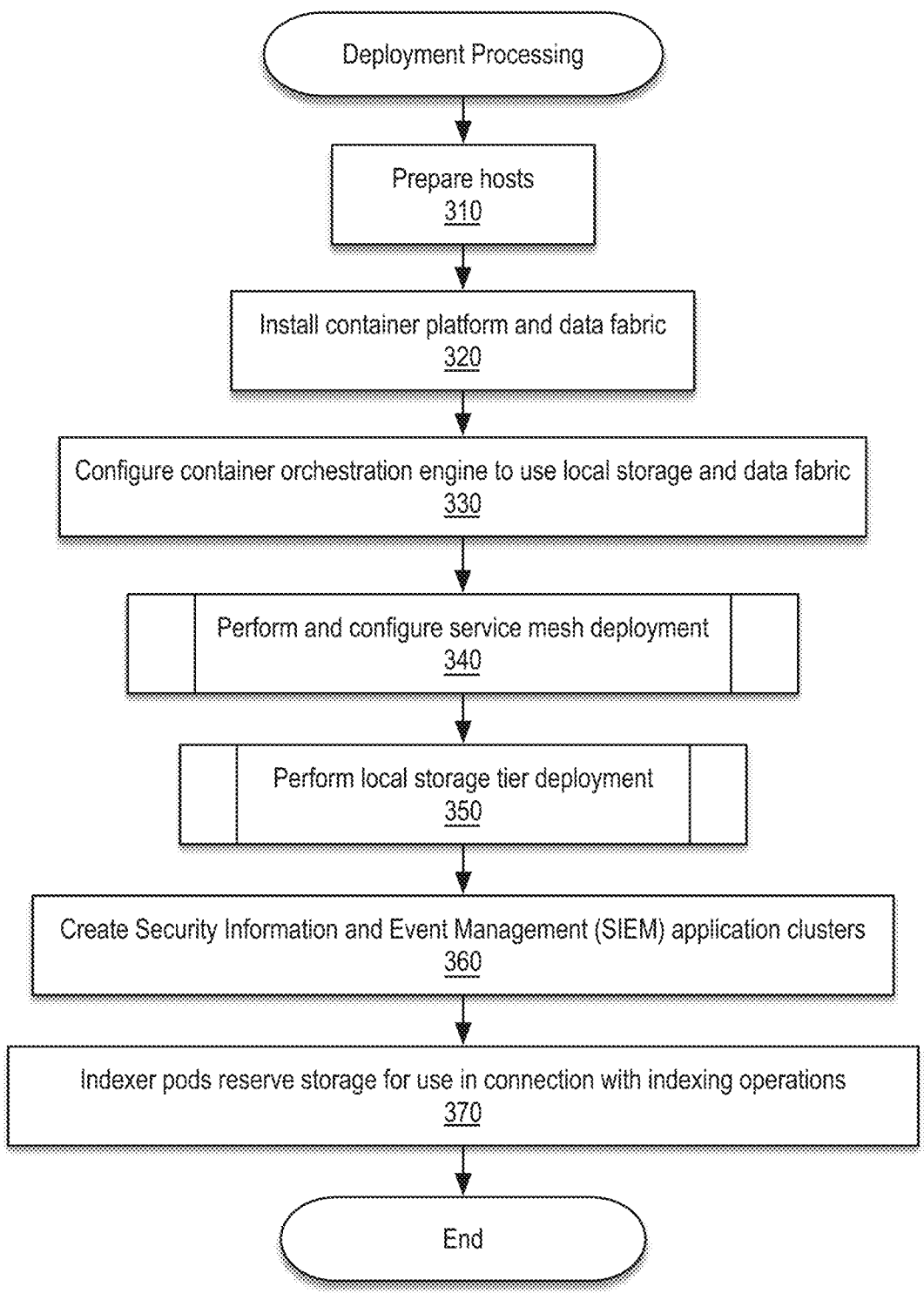
FIG. 3 shows a high-level flow diagram illustrating exemplary deployment processing.

FIG. 3 shows a high-level flow diagram illustrating deployment processing in accordance with an example embodiment. In the context of the present example, hosts (e.g., bare-metal servers) are configured to provide an environment such as described above with reference to FIG. 2 in which a container platform (e.g., container platform 220) may orchestrate running containers of a SIEM application directly on bare metal.

At block 310, the hosts on which the container platform is to be installed may be prepared. For example, appropriate firmware and operating system software may be installed on the hosts.

At block 320, the container platform may be installed. Depending upon the particular container platform, this may involve installing a binary or a binary package.

At block 330, the container orchestration engine (e.g., Kubernetes®) may be configured to use local storage and the data fabric. For example, supporting role components (e.g., search head cluster masters 251a-b and index cluster masters 252a-b) may be to configured store state and/or configuration data desired to be persisted via distributed data fabric 232, and worker role components (e.g., indexer applications 237a-b) may be configured to use local host storage (e.g., local storage 239a-b).

According to one embodiment, this may involve container platform 220 setting up CSI drivers (e.g., CSIs 238a-b and CSI 234a-b) and storage classes. For example, in the context of Kubernetes® the CSI drivers may be deployed on Kubernetes® by registering them via the kubelet plugin registration mechanism. For example, the hosts may be prepared for use by OpenEBS and then a determination may be made regarding whether the architect desires to implement "hostpath" (e.g., a thinpool set up or other volume on the host system), "device" (e.g., to use the entire device and let OpenEBS manage the partitions), and other considerations (e.g., replications and the like). In Kubernetes® a Storage-Class provides a way for administrators to describe the "classes" of storage they offer. Different classes might map to quality-of-service levels, or to backup policies, or to arbitrary policies determined by the cluster administrators.

At block 340, service mesh deployment may be performed. For example, service meshes (e.g., ingress gateways 233a-b) may be deployed and configured within a container cluster (e.g., cluster 230). In one embodiment, service mesh deployment creates the service mesh deployment architecture described in further detail below with reference to FIG. 4. A non-limiting example of service mesh deployment processing is described with reference to FIGS. 5A-B.

At block 350, local storage deployment is performed. By way of background, it is noted in Container Attached Storage (CAS) architecture, storage may be run within containers and may be closely associated with the application to which the storage is bound. For example, storage may run as a micro service and will therefore have no Kernel module dependencies. In this manner, container orchestration engines, such as Kubernetes®, may orchestrate storage volumes like any other micro services or container. In various embodiments described herein, the storage control plane and the data plane may be run as Kubernetes® pods.

In one embodiment, local storage deployment involves the configuration of storage control plane hosts and storage data hosts pertaining to the storage of local data by SIEM application components (e.g., indexers 237a-b) on local storage (e.g. local storage 239a). For example, storage control plane hosts may relate to supporting role components described above, and storage data nodes may relate to worker role components described above. A non-limiting example of local storage deployment processing is described with reference to FIGS. 6A-B.

At block 360, SIEM application clusters are created. In one embodiment, this involves the creation of search pods to run multiple instances of search applications (e.g., search applications 235a-b) within a search head cluster (e.g., search head cluster 250a-b) and the creation of indexer pods to run multiple instances of indexer applications (e.g., indexer applications 237a-b) within an indexer cluster (e.g., indexer cluster 260a-b)

At block 370, the indexer pods reserve storage and memory for use in connection with indexing operations. For example, each indexer pod may preserve for itself a predefined or configurable portion of RAM and NVMe of the local host on which it runs. According to one embodiment indexer pods make requests for storage in the form of Persistent Volume Claims (PVCs) from the local storage that may be designated in block 320. Persistent Volume Claims (PVCs), which represent an abstraction layer to the underlying storage. The PVCs result in a binding to a PV. As noted above, in one embodiment, the speed and efficiency of the indexing operations performed by the indexer applications may be greatly enhanced by configuring this abstraction layer to ensure data persisted by a particular indexer applications is maintained locally on a storage device associated with the host on which the particular indexer application is running. In such an embodiment, the PVCs result in a binding to local PVs within storages devices of the respective local hosts.

Figure 4:
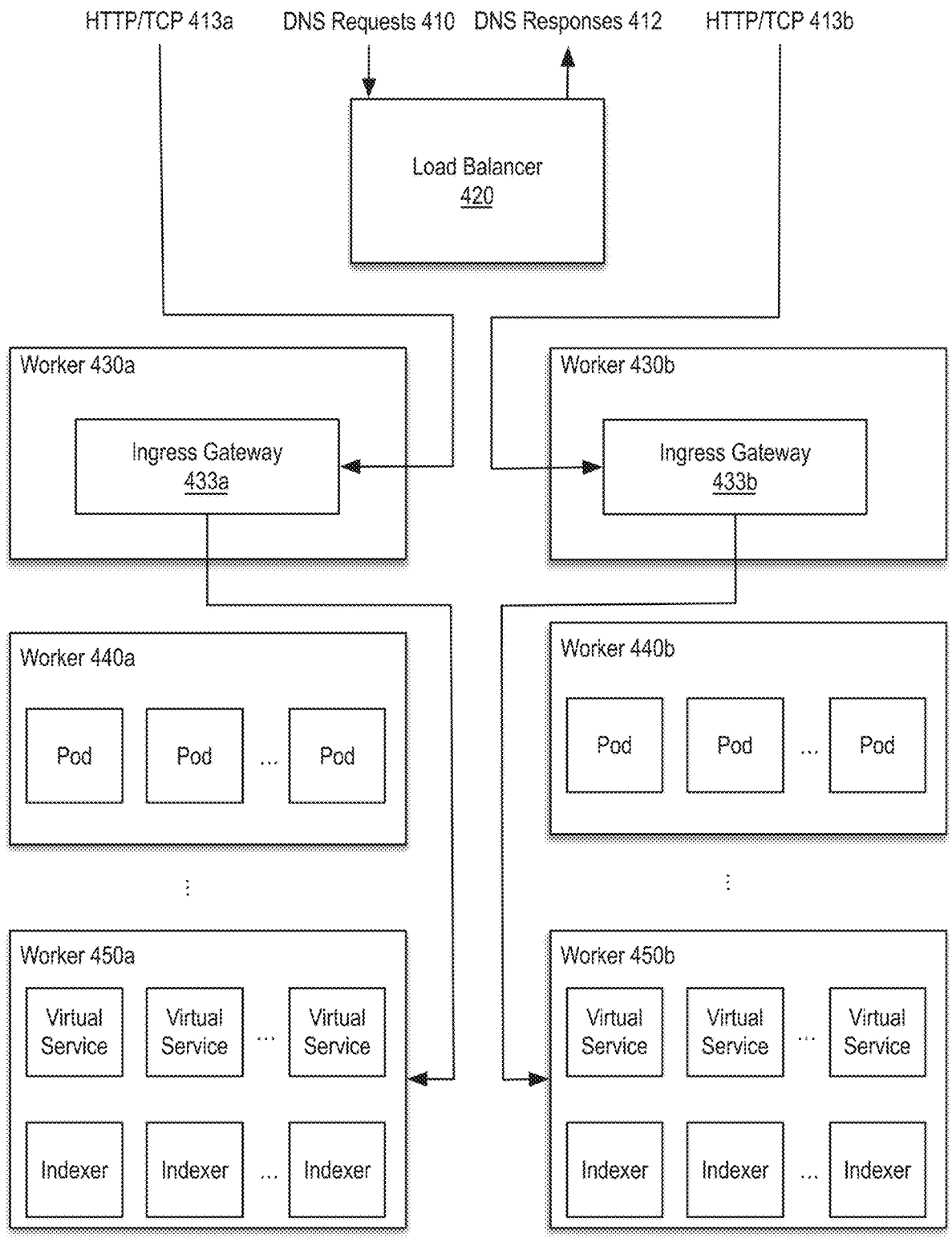
FIG. 4 shows a block diagram conceptually illustrating an exemplary service mesh deployment architecture.

FIG. 4 is a block diagram conceptually illustrating a service mesh deployment architecture in accordance with an example embodiment. In the context of this example, a network load balancer (e.g., load balancer 420) may perform Domain Name System (DNS) load balancing to route traffic to a first site (e.g., data center 210a) or a second site (data center 210b). The first site may include, among others, workers 430a, 440a, and 450a and the second site may include, among others, workers 430b, 440b, and 450b. The workers may represent a subset of hosts 121a-n of FIG. 1. The workers 430a, 440a, 450a, 430b, 440b, and 450b may be Kubernetes® worker nodes, for example.

In one embodiment, workers 430a-b include respective ingress gateways 433a-b (which may correspond to ingress gateways 233a-b of FIG. 2). In one embodiment, the ingress gateways 433a-b are run in dedicated pods on their respective dedicated hosts (i.e., workers 430a-b).

Workers 440a-b may represent control plane hosts in which the various control plane pods running various applications (e.g., Grafana, Prometheus, and the like) for automating deployment, scaling, and/or management of containerized applications. The control plane pods may also include an application (e.g., Kiali) representing a management console for the service mesh that provides for service mesh observability and configuration.

In this example, the Kubernetes® workers 450a-b may represent hosts dedicated to running respective groups of indexers (e.g., forming an indexer cluster).

According to one embodiment, traffic (e.g., HTTP/TCP 411a-b), for example, from external systems, such as infrastructure (e.g., infrastructure 11a-x) or agents running thereon (e.g., forwarders), containing event data (e.g., event data 111) may be distributed across the multiple ingress gateways as a result of load balancer 420 performing Domain Name System (DNS) load balancing. According to one embodiment, load balancer 420 may perform round-robin DNS by issuing responses (e.g., DNS responses 412) to address requests (e.g., DNS requests 410) received from the external system according to a statistical model. For example, load balancer 420 may respond to address requests by providing a single IP address of ingress gateway 433a or 433b or by providing a prioritized list of IP addresses of ingress gateways 433a-b in which the IP addresses in the prioritized list are permuted in accordance with a round-robin model. Responsive to receipt of the response from load balancer 420, the external system may then direct its request to the appropriate ingress gateway 433a or 433b, and ingress gateway 433a or 433b routes the request to an appropriate worker 450a-b. Additional non-limiting examples of locality-based routing to individual pods, such as indexers, is described further below with reference to FIG. 7.

Figure 5A:
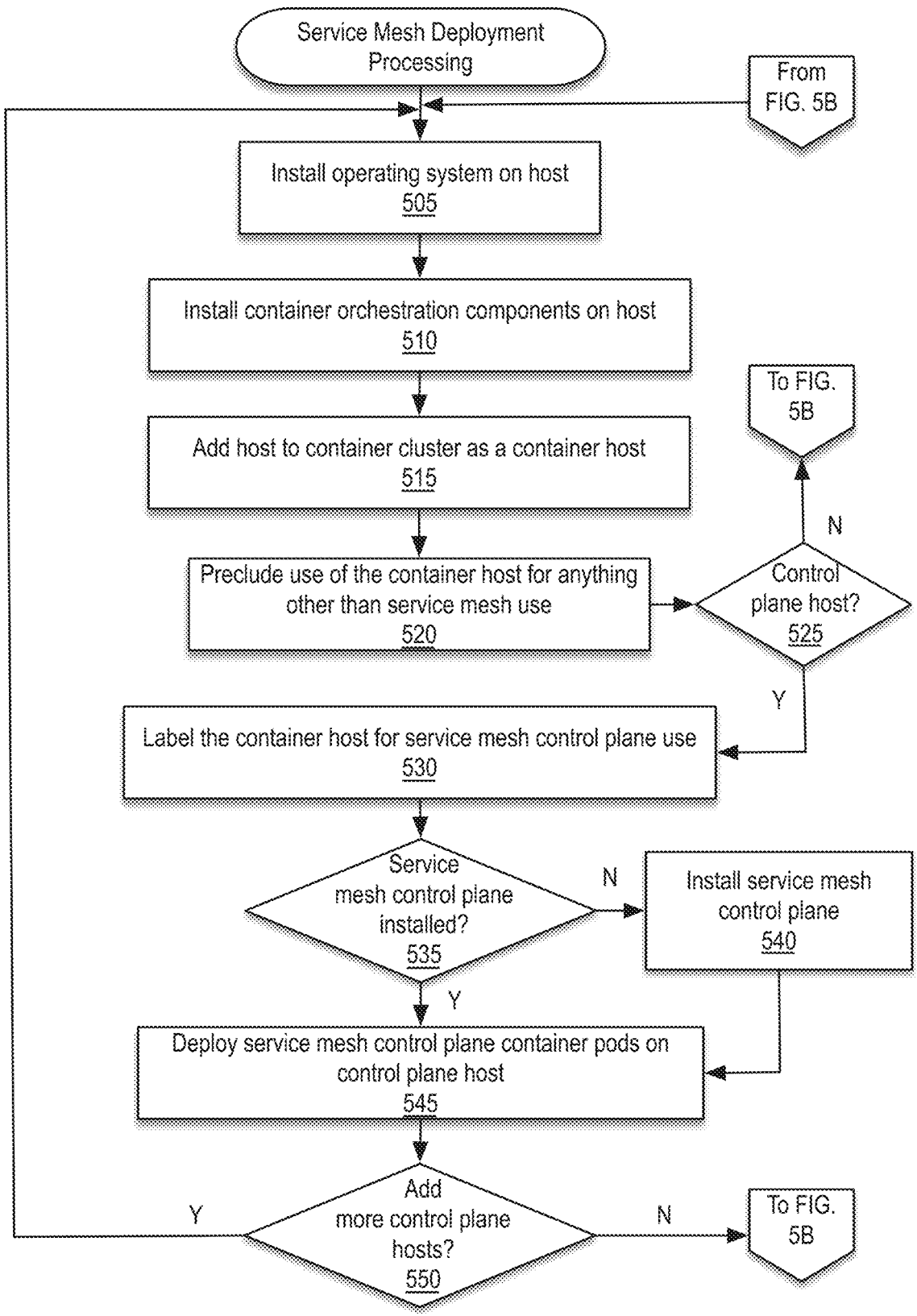
FIGS. 5A-B collectively show a flow diagram illustrating exemplary service mesh deployment processing.
Figure 5B:
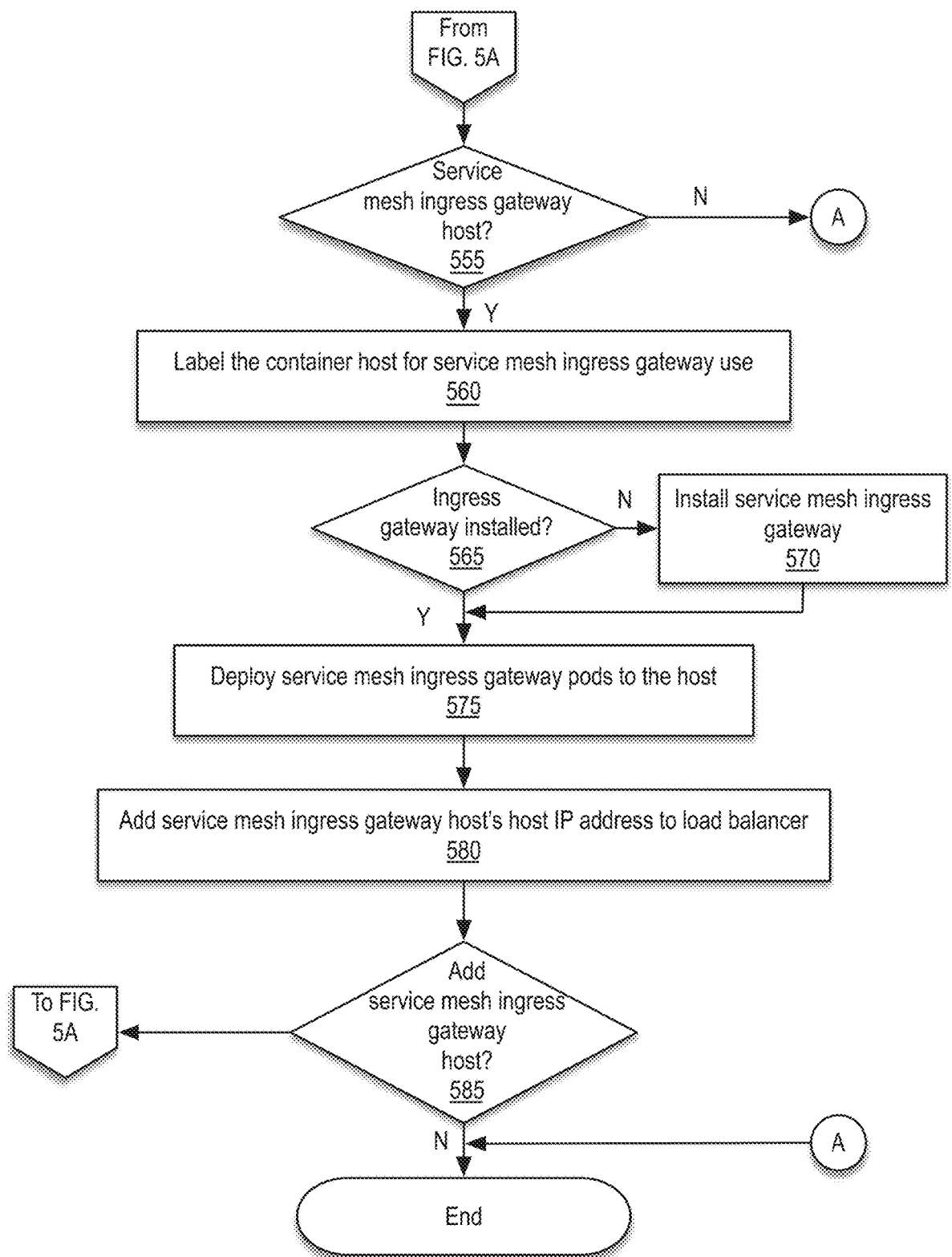

FIGS. 5A-B collectively represent a flow diagram illustrating service mesh deployment processing in accordance with an example embodiment. For simplicity up to this point, ingress gateways (e.g., ingress gateways 233a-b) and service mesh functionality have been described without going into some of the details of the associated control and data planes, for sake of completeness, an example of service mesh deployment processing is now provided.

By way of background, service mesh data plane container pods may be understood to represent an interface or proxy between the service mesh and the virtual services within the container cluster. In one embodiment, the service mesh may make use of sidecars, for example, as an intermediary, to communicate with containers within a pod. In such an example, a technique referred to as sidecar injection may be employed to add the configuration of additional containers to the pod template. As such, in some embodiments, the virtual services and the service mesh may not communicate directly, but rather indirectly via the injected sidecar container. For example, in the context of an Istio gateway, the traffic management model may rely on Envoy proxies that are deployed along with the services. As such, in this example, traffic handled by the Istio gateway may be said to be proxied through Envoy, which has the advantage of making it easy to direct and control traffic around the mesh without making changes to the services.

In the context of the present example, ingress gateways (e.g., ingress gateways 233*a-b*), which are also referred to herein as service meshes or service mesh ingress gateway nodes, are each run on a dedicated host of multiple hosts (e.g., hosts 121*a-n*) of a container cluster (e.g., cluster 230). In this manner, throughput of event data (e.g., event data 111) is unimpeded by other extraneous processing, as resources of those dedicated hosts may be dedicated to the service mesh rather than other workloads (e.g., processes of a SIEM application and/or management services operable within the container cluster).

At block 505, an operating system may be installed on a host, and at block 510, the container orchestration components may be installed on the host.

At block 515, the host may be added to the container cluster as a container host.

At block 520, the use of the container host for purposes other than the service mesh may be precluded. In the context of Kubernetes®, this is performed by a taint command that repels pods of other types (e.g., indexer application pods and/or search application pods) from being scheduled onto the container host. Advantageously, in this manner, various embodiments seek to prevent resource starvation of control plane components.

At decision block 525, it may be determined whether the container host is designated as a control plane host (e.g., as opposed to a service mesh ingress gateway host or other). If so, then processing proceeds with block 530; otherwise, processing branches to decision block 555 of FIG. 5B.

At block 530, the container host may be labeled for service mesh control plane use.

At decision block 535, it may be determined whether a service mesh control plane is installed on the control plane host. For example, in some solutions, the service mesh may be preinstalled. If so, the processing proceeds with block 545; otherwise processing branches to block 540 in which the service mesh control plane is installed on the control plane host before proceeding with block 545. A service mesh control plane may be understood to be a control plane through which the service mesh communicates with virtual services within the container cluster.

At block 545, service mesh control plane container pods are deployed on the control plane host. In one embodiment, these control plane container pods manage the distributed stateless sidecar proxy within the data plane.

At decision block 550, it may be determined whether more control plane hosts are to be added for the service mesh deployment architecture at issue. If so, then processing loops back to block 505 to initialize another host of the cluster; otherwise, processing continues with decision block 555 of FIG. 5B.

At decision block 555, it may be determined whether the container host is a service mesh ingress gateway host. If so, processing continues with block 560; otherwise service mesh deployment processing is complete.

At block 560, the container host may be labeled for service mesh ingress gateway use.

At decision block 565, it may be determined whether the ingress gateway has been installed. If so, processing continues with block 575; otherwise, processing branches to block 570 in which the service mesh ingress gateway is installed before proceeding with block 575.

At block 575, service mesh ingress gateway pods may be deployed to the host. This may involve configuring the pods to use the IP address and port(s) of the host on which the service mesh ingress gateway node resides, including making a call to open the port(s) on the host. In one embodiment, the service mesh may make use of port 8080 (HTTP), port 443 (HTTPS), and/or port 9997 (TCP).

At block 580, the service mesh ingress gateway node's host Internet Protocol (IP) address may be added to the network load balancer.

At decision block 585, it may be determined whether more service mesh ingress gateway nodes are to be added in accordance with the service mesh deployment architecture at issue. If so, then processing loops back to block 505 of FIG. 5A; otherwise, service mesh deployment processing is complete.

Figure 6A:
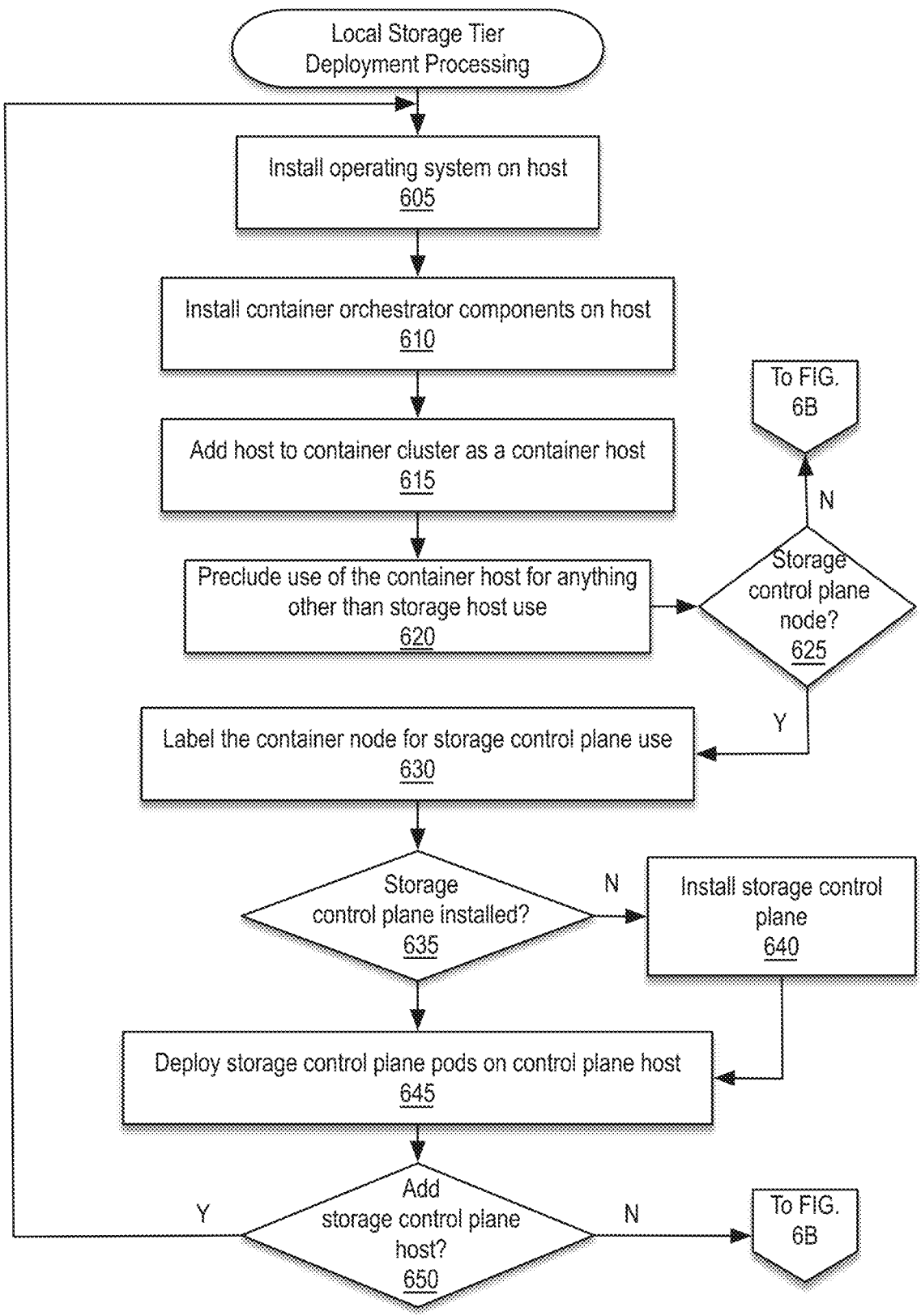
FIGS. 6A-B collectively show a flow diagram illustrating exemplary storage deployment processing.
Figure 6B:
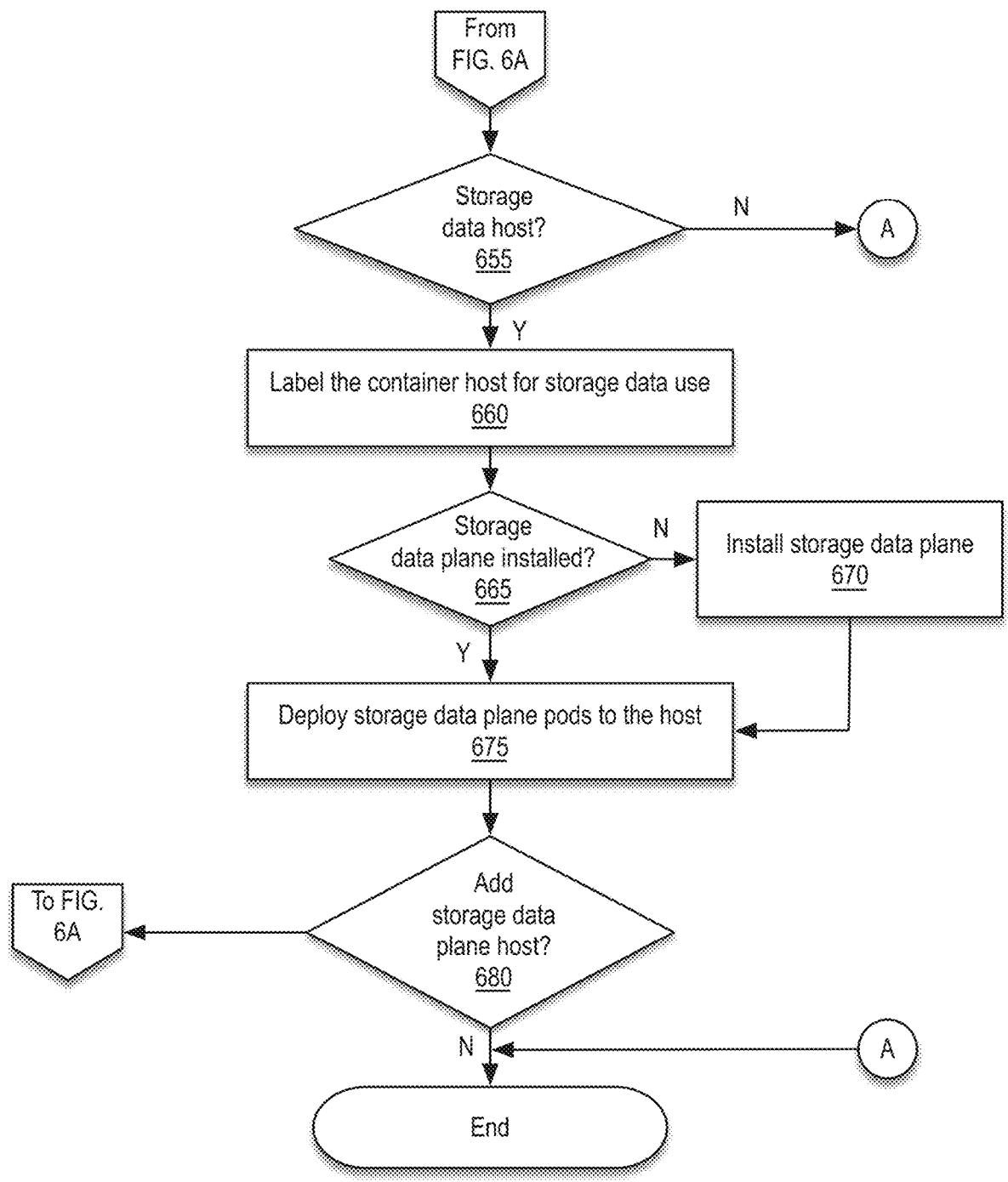

FIGS. 6A-B collectively show a flow diagram illustrating exemplary storage deployment processing. In the context of the present example, a subset of hosts (e.g., hosts 121*a-n*) of a container cluster (e.g., cluster 230) are configured for use by and/or in support of the SIEM application as storage control plane hosts and storage data hosts. According to one embodiment, the storage data plane may be the Docker® Thinpool, which by be installed by the container platform (e.g., container platform 220) in block 330 of FIG. 3, and which may be used for local storage by the indexers (e.g., indexer applications 237*a-b*).

At block 605, an operating system may be installed on a host and at block 610, the container orchestration components are installed on the host.

At block 615, the host may be added to the container cluster as a container host.

At block 620, the use of the container host for purposes other than as a storage host may be precluded. In the context of Kubernetes®, this is performed by a taint command that repels pods of other types from being scheduled onto the container host.

At decision block 625, it may be determined whether the container host is designated as a storage control plane host. If so, then processing proceeds with block 630; otherwise, processing branches to decision block 655 of FIG. 6B.

At block 630, the container host may be labeled for storage control plane use.

At decision block 635, it may be determined whether the storage control plane is installed on the storage control plane host. If so, the processing proceeds with block 645; otherwise processing branches to block 640 in which the storage control plane is installed on the control plane host before proceeding with block 645. A storage control plane may be understood to refer to functionality relating to managing access to and facilitating dynamic allocation and destruction of volumes on the local storage device (e.g., local storage 239*a-b*) of a host.

At block 645, storage control plane container pods are deployed on the control plane host. Non-limiting examples of storage control plane container pods include a storage controller and a storage provisioner configured to make use of CSIs 239*a-b*, Internet Small Computer Systems Interface (iSCSI) and OpenEBS.

At decision block 650, it may be determined whether more storage control plane hosts are to be added for the storage deployment architecture at issue. If so, then processing loops back to block 605 to initialize another host of the cluster; otherwise, processing continues with decision block 655 of FIG. 6B.

At decision block 655, it may be determined whether the container host is a storage data host. If so, processing continues with block 660; otherwise storage deployment processing is complete.

At block 660, the container host may be labeled for storage data use.

At decision block 665, it may be determined whether the storage data plane has been installed. If so, processing continues with block 675; otherwise, processing branches to block 670 in which the storage data plane is installed before proceeding with block 675.

At decision block 680, it may be determined whether more storage data plane hosts are to be added in accordance with the storage deployment architecture at issue. If so, then processing loop back to block 605 of FIG. 6A; otherwise, storage deployment processing is complete.

While in the context of the present example, storage control plane setup is described with reference to FIG. 6A and storage data plane set up is described with reference to FIG. 6B, in alternative embodiments, it is to be understood that the storage data plane setup may be performed before the storage control plane setup.

Figure 7:
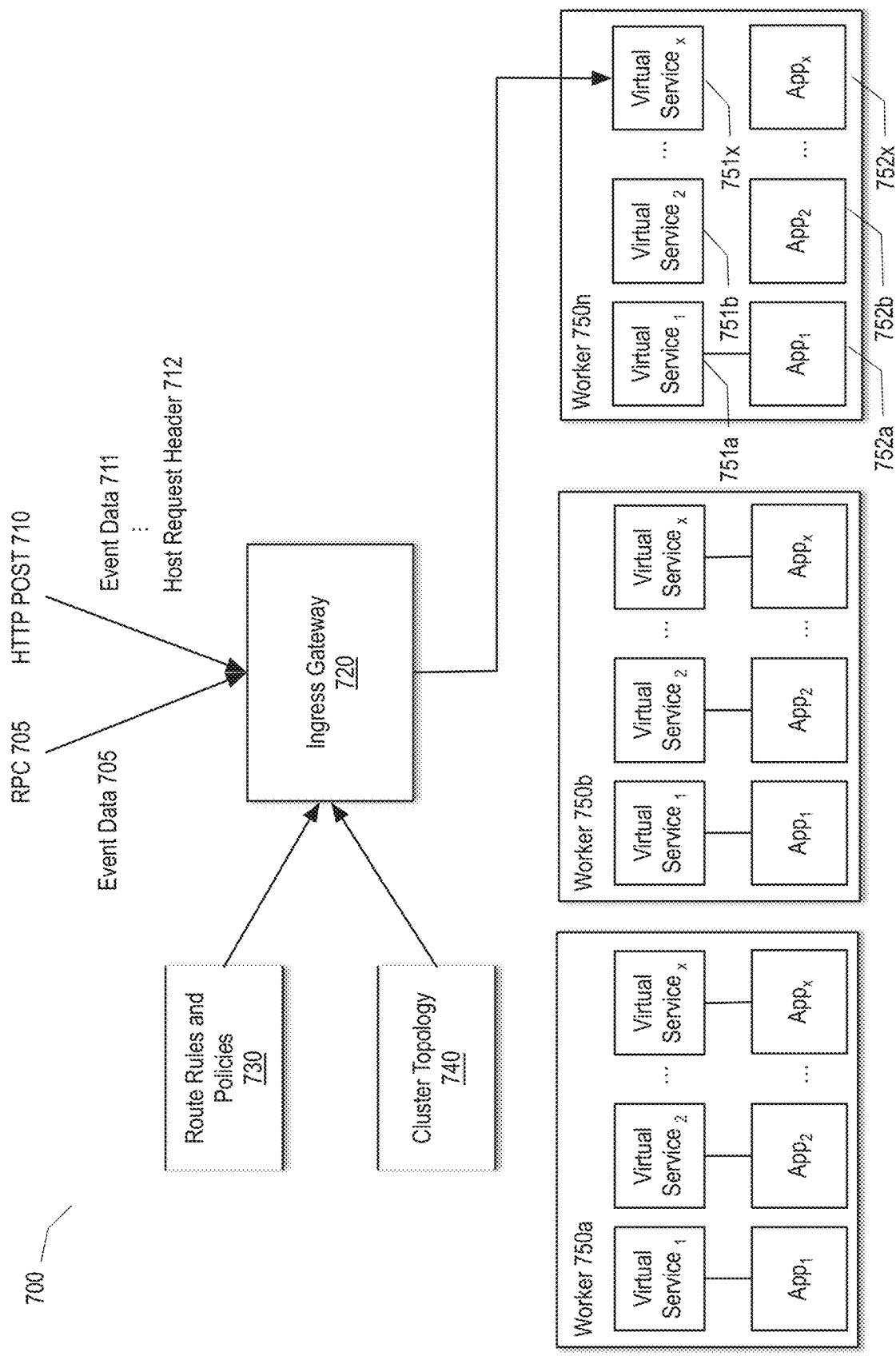
FIG. 7 shows a block diagram conceptually illustrating exemplary locality-based load balancing.

FIG. 7 shows a block diagram conceptually illustrating exemplary locality-based load balancing 700. In the context of the present example, ingress gateway 720 (which may correspond to ingress gateways 233*a-b* of FIG. 2) load balances received traffic (e.g., traffic in the form of Remote Procedure Call (RPC) 705 via TCP or in the form of HTTP POST request 710) among multiple worker nodes 750*a-n* (e.g., each representing one of hosts 121*a-n*) running containerized applications 751*a-x* (e.g., search applications 235*a-b* and/or indexer applications 237*a-b*) exposed in the form of respective virtual services 752*a-x*. The worker nodes 750*a-n* may be Kubernetes® worker nodes, for example. In one embodiment, the load balancing approach employed is locality-based load balancing, which may involve prioritizing the use of local virtual services (e.g., those running in the same data center in which ingress gateway 720 resides) to handle a received request over the use of remote virtual services (e.g., those running in a remote data center).

In the context of the present example, HTTP POST request 710 contains, among other things, event data 711 (which may correspond to event data 111 of FIG. 1) and host request header 712. Host request header 712 may specify the host to which the request is directed in the form of a Fully Qualified Domain Name (FQDN) (e.g., indexer.<application>.com or search.<application>.com). Ingress gateway 720 may use host request header 712 to identify a particular type of virtual service (e.g., indexer or search) to which the request is to be sent and may additionally use route rules and policies 730 and cluster topology 740 to further select among available virtual services of the particular type. According to one embodiment the route rules are VirtualServices used to describe a mapping from one or more user-addressable destinations (e.g., ingress gateway 720) to the actual destination workloads (e.g., virtual services 751*a-x*) and the route rules are DestinationRules defining policies to be applied to a request after VirtualService routing has occurred.

When event data 705 is instead received by ingress gateway 720 as part of RPC 705 via TCP, for example, from a log forwarder (e.g., a Splunk Forwarder), event data 705 the particular type of virtual service (i.e., indexer) to which event data 705 is to be sent may be assumed based on the port (e.g., port number 9997) on which the TCP traffic is received. Then, selection among the available indexer virtual services may be performed as above based on route rules and policies 730 and cluster topology 740. A non-limiting example of ingress gateway processing is described below with reference to FIG. 9.

Figure 8:
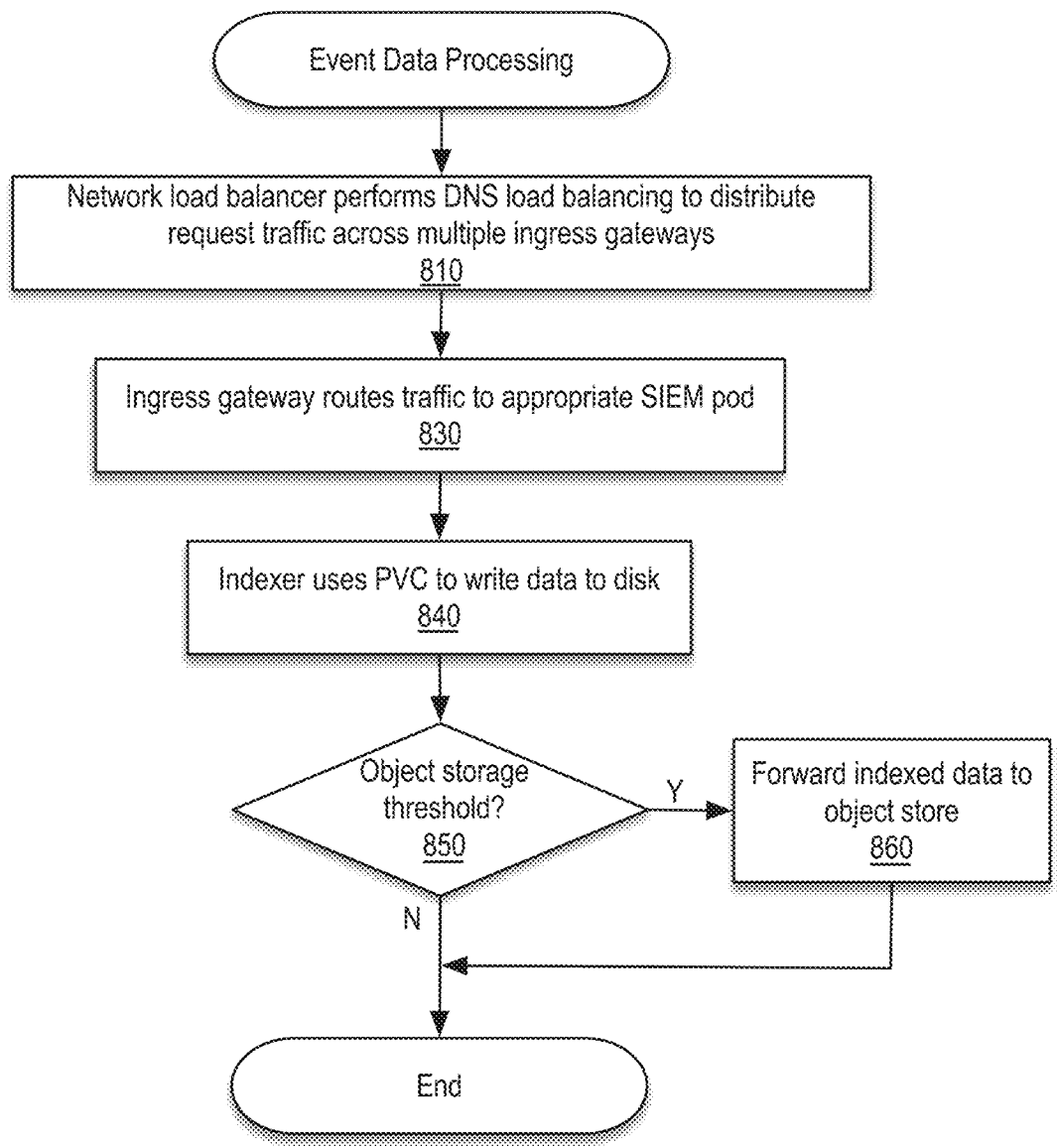
FIG. 8 shows a flow diagram illustrating exemplary event data processing.

FIG. 8 shows a flow diagram illustrating event data processing in accordance with an example embodiment. In the context of the present example, multiple ingress gateways (e.g., ingress gateways 233*a-b*) within a cluster (e.g., cluster 230) have fixed IP addresses that are publicly exposed, thereby making the ingress gateways user-addressable destinations and capable of directly receiving requests from or on behalf of infrastructure (e.g., infrastructure 110*a-x*) and/or or clients 140*a-z*.

At block 810, a network load balancer (e.g., load balancer 420 of FIG. 4) may perform Domain Name System (DNS) load balancing to cause request traffic (e.g., HTTP POST requests or TCP connections) containing event data (e.g., event data 111) to be distributed across the multiple ingress gateways. As those skilled in the art will appreciate search requests (e.g., HTTP GET requests) from clients 140*a-z* may also be load balanced.

At block 820, responsive to receipt of the event data (e.g., contained within an HTTP POST request or an RCP), the ingress gateway routes the traffic to an appropriate SIEM pod (e.g., running an instance of an indexer application). According to one embodiment, the ingress gateway may distribute the traffic in accordance with a locality-based load balancing approach described with reference to FIGS. 7 and 9.

At block 840, the indexer (e.g., one of indexer applications 237*a-b*) may use a previously established PVC (e.g., at block 370 of FIG. 3) to write data to a local disk of the host on which it is running.

At decision block 850, a determination may be made regarding whether the indexed data has reached a predefined or configurable object storage threshold (e.g., 750 GB). If so, the indexed data is forwarded to an object store (e.g., one of object stores 240*a-b*); otherwise, event data processing is complete.

Figure 9:
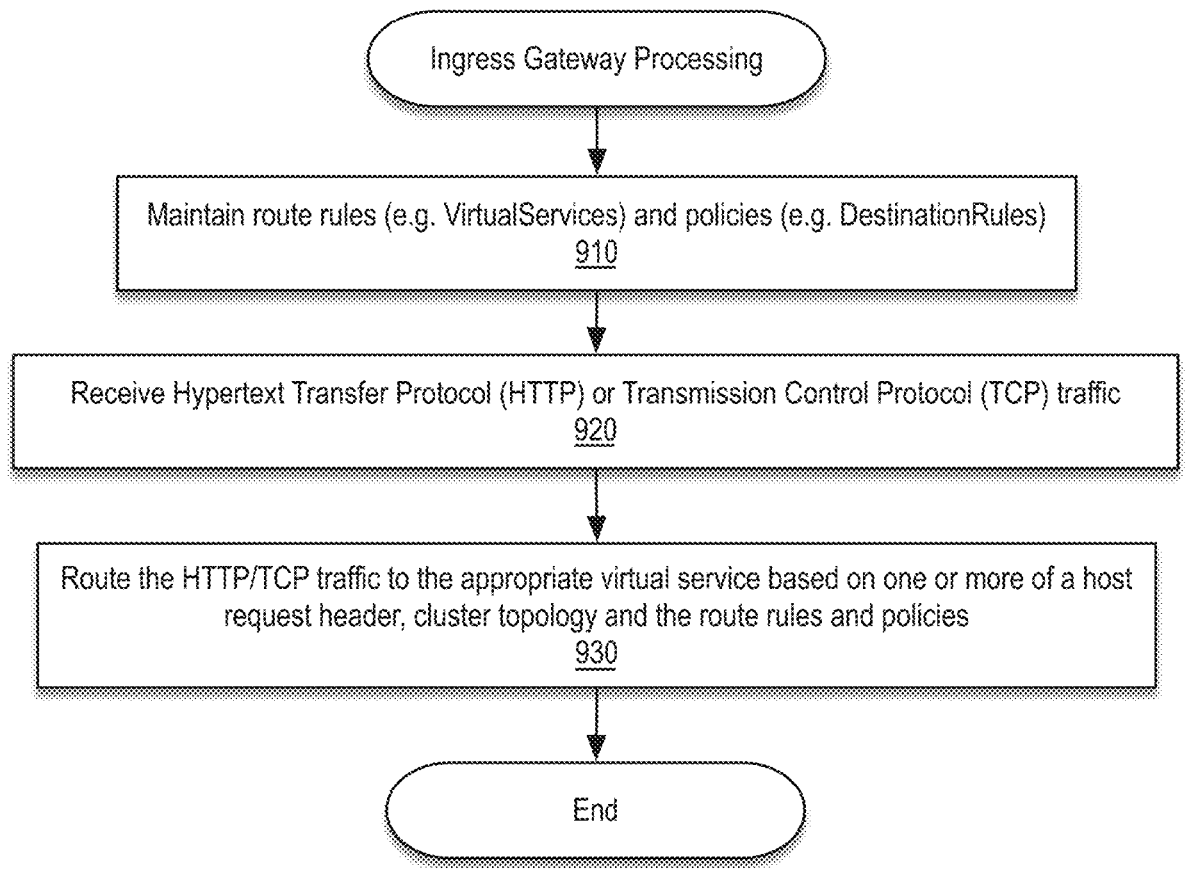
FIG. 9 shows a flow diagram illustrating exemplary ingress gateway processing.

FIG. 9 is a flow diagram illustrating ingress gateway processing in accordance with an example embodiment. In one embodiment, ingress gateways (e.g., ingress gateways 233*a-b*) may route allowed traffic received from an external source (e.g., external source 215) to an appropriate virtual service. In some embodiment, locality load balancing may be applied to the traffic. While traffic directed to any application component of a SIEM application may be routed by the ingress gateways, the present example focuses on requests directed to an indexer component (e.g., indexer application 237*a-b*).

At block 910, route rules and policies (e.g., route rules and policies 730) may be maintained by the ingress gateway. The route rules and policies may be maintained in the form of VirtualServices and DestinationRules.

At block 920, HTTP or TCP traffic may be received by the ingress gateway. In one embodiment, event data (e.g., event data 111) may be delivered to a cluster (e.g., cluster 230) for parsing, indexing, and storage. For example, a log forwarder may issue an HTTP POST or make an RPC over TCP to a fixed IP address associated with the ingress gateway that is to be processed by an instance of the indexer component via the ingress gateway. The indexer component may be a containerized application component exposed to the service mesh in the form of a corresponding a virtual service.

At block 930, the HTTP or TCP traffic is routed to the appropriate virtual service based on one or more of a host request header (when the traffic is an HTTP request), information regarding the topology of the cluster (e.g., cluster topology 740), and the route rules and policies. The routing may involve some form of load balancing. Those skilled in the art will appreciate there are numerous types of load balancing algorithms, including, but not limited to round-robin load balancing, weighted round-robin, least connection load balancing, weighted least connection load balancing, resource-based (adaptive) load balancing, fixed weighted load balancing, weighted response time load balancing, and locality-based load balancing. Depending upon the particular implementation, any or none of the aforementioned load balancing approaches may be used. In one embodiment, the ingress gateway prioritizes the use of local virtual services (e.g., those running in the same data center in which the ingress gateway resides) to handle a received request over the use of remote virtual services (e.g., those running in a remote data center) by performing locality-based load balancing.

In some implementations, user-defined percentages (e.g., from 0% to 100%) of traffic may be specified for distribution from a source location (e.g., specified by a region, zone, and subzone triplet) to one or more destination locations. For example, traffic received by particular ingress gateway in a particular data center (e.g., data center 210*a*) may be configured to keep X % of the traffic it receives within the particular data center and to send Y % of traffic out to another data center (e.g., data center 210*b*), where X may be 0% to 100%, inclusive, Y may be 0% to 100% inclusive, subject to the sum of X and Y being 100%.

As noted above with reference to FIG. 7, when a host request header (e.g., host request header is present in the request (i.e., when the traffic comprises an HTTP request), an FQDN contained within the host request header may be indicative of the particular type of virtual service (e.g., indexer or search) to which the request is to be sent, and the ingress router may further apply the route rules and policies and/or the cluster topology to further select among available virtual services of the particular type.

Alternatively, when the event data is instead received by the ingress gateway as part of RPC 705 via TCP, for example, from a log forwarder, the traffic is assumed to be destined for an indexer virtual service based on the port (e.g., port number 9997) on which the TCP traffic is received. Then, as above, selection among the available indexer virtual services may be performed based on one or both of the route rules and policies and the cluster topology.

Figure 10:
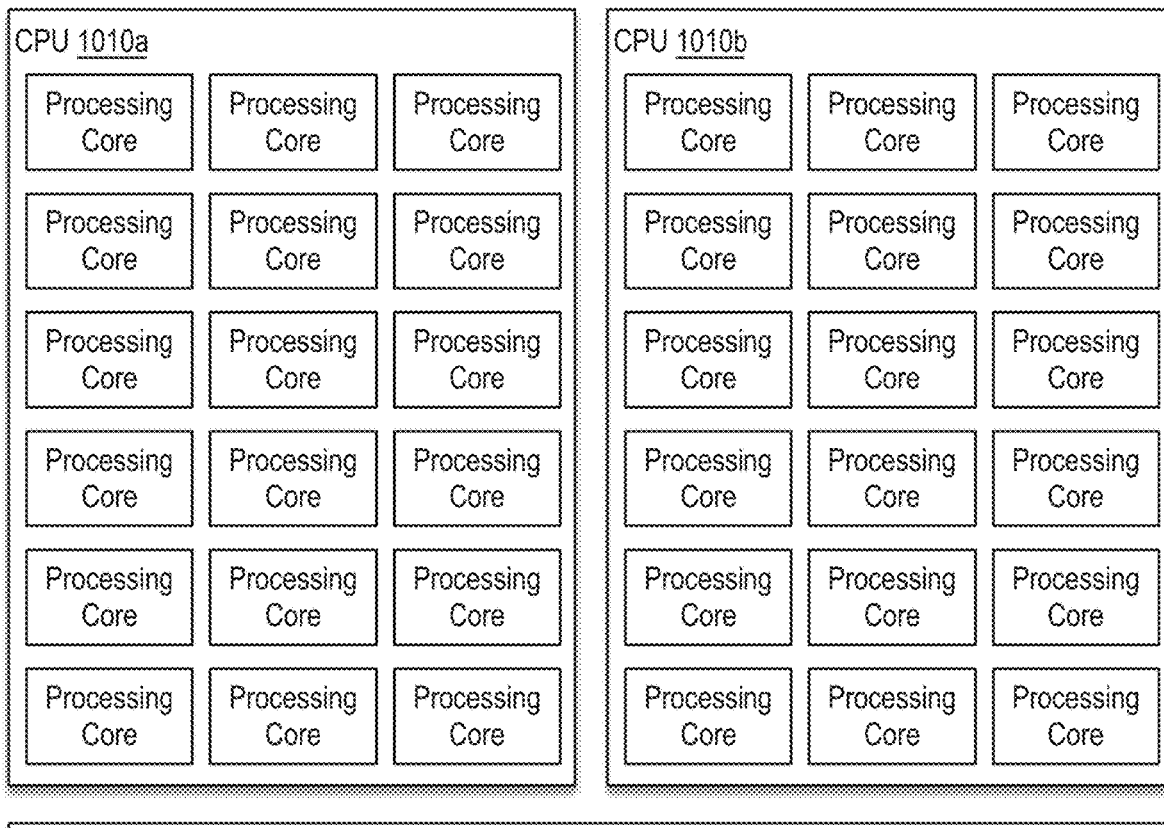
FIG. 10 shows a block diagram of an exemplary server representing a cluster host.
Figure 10:
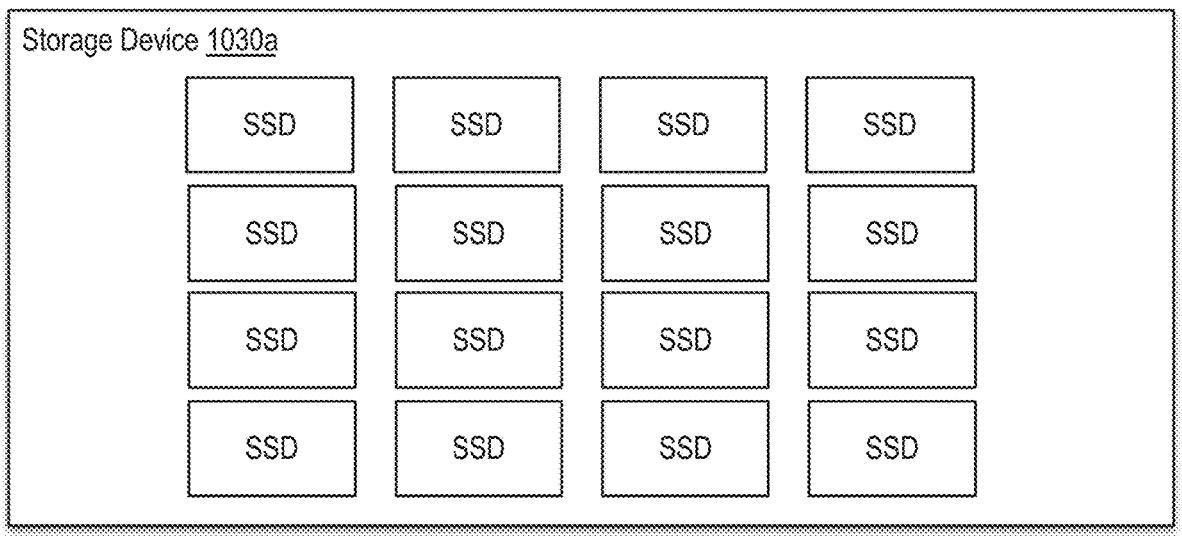

FIG. 10 shows a block diagram of server 1000 representing a cluster host in accordance with an example embodiment. In some cases, servers may not be optimized for the workload characteristics of SIEM applications, and existing SIEM deployments may underutilize processing, memory, and storage resources. Furthermore, various default setting of other applications (e.g., Kafka) may not be sufficient to keep pace with the increased data flow resulting from running multiple instances of components of SIEM applications on a single server and should be adjusted.

A specific combination of processing resource, memory, and storage components of server architecture for hosts supporting a container platform (e.g. container platform 220 and a cluster (e.g., cluster 230) may be determined based on an experimental approach involving observing the performance of a number of containerized instances of one or more components of the SIEM application that are capable of being packed onto one server of a set of multiple servers relative to a baseline established or determined with reference to running one non-containerized instance of the one or more components of the SIEM application on the same server or another server of the set of multiple servers having the same architecture and configuration. Such an experimental approach may include, in an example, finding a combination of components that allow for packing a number of containerized instances that utilizes a particular amount of system resources (e.g., >80% processing resource utilization, to avoid under-utilization) while extracting at least the same or greater performance from those containerized instances relative to the baseline (e.g., according to ingestion rate). More particularly, the experimental approach may include establishing a baseline of a performance metric (e.g., ingestion rate) by running one non-containerized instance of a component of a Security Information and Event Management (SIEM) application on a first host, such as an indexer component. Then, to determine an optimal hardware combination of processing resource, memory, and storage components for the first host, an iterative process is undertaken, that includes running a number of containerized instances of the component within a bare-metal container environment on the first host configured with a test configuration of the hardware combination, measuring the performance metric while running the number of containerized instances, and then changing the test configuration of the combination in response to the measured performance metric. For example, the test configuration may be changed such to improve the measured performance metric on the next iteration (i.e., next measured performance metric). The number of containerized instances may also be increased over subsequent iterations, starting from, e.g., one instance at the baseline measurement. The iterative process may stop once performance increase has reached a point of diminishing returns. The experimental approach may be performed as a computer simulation, for example. In other cases, the experimental approach may be performed on various configurations of physical servers.

In one embodiment, server 1000 optimized in accordance with this experimental approach may include at least two CPUs 1010*a-b*, operating at a clock rate of greater than 3 GHz and each having at least eighteen processing cores. Server 1000 also may include at least 768 GB of RAM 1020 and storage device 1030*a* having at least sixteen NVMe SSDs, for example, each SSD including at least 1.92 TB capacity. An HPE ProLiant DL380 Gen10 server produced by Hewlett Packard Enterprise Company with Intel® Xeon® processors produced by Intel Corporation is a non-limiting example of a server in which such a server architecture is achievable.

In one embodiment, running at least two containerized instances of an indexer application (e.g., indexer application 237*a-b*) on server 100 may increase event data ingestion rates to at least 1 TB per host per day. Furthermore, the ingestion rate may increase as a function of the number of instances of the containerized SIEM application component, until one or more system resources (e.g., processing resources, memory, storage I/O, or network I/O) are saturated. Empirical data suggest approximately between 12 and 18 instances of an indexer application (e.g., indexer application 237*a-b*) can be stacked onto a server having the aforementioned architecture.

Figure 11:
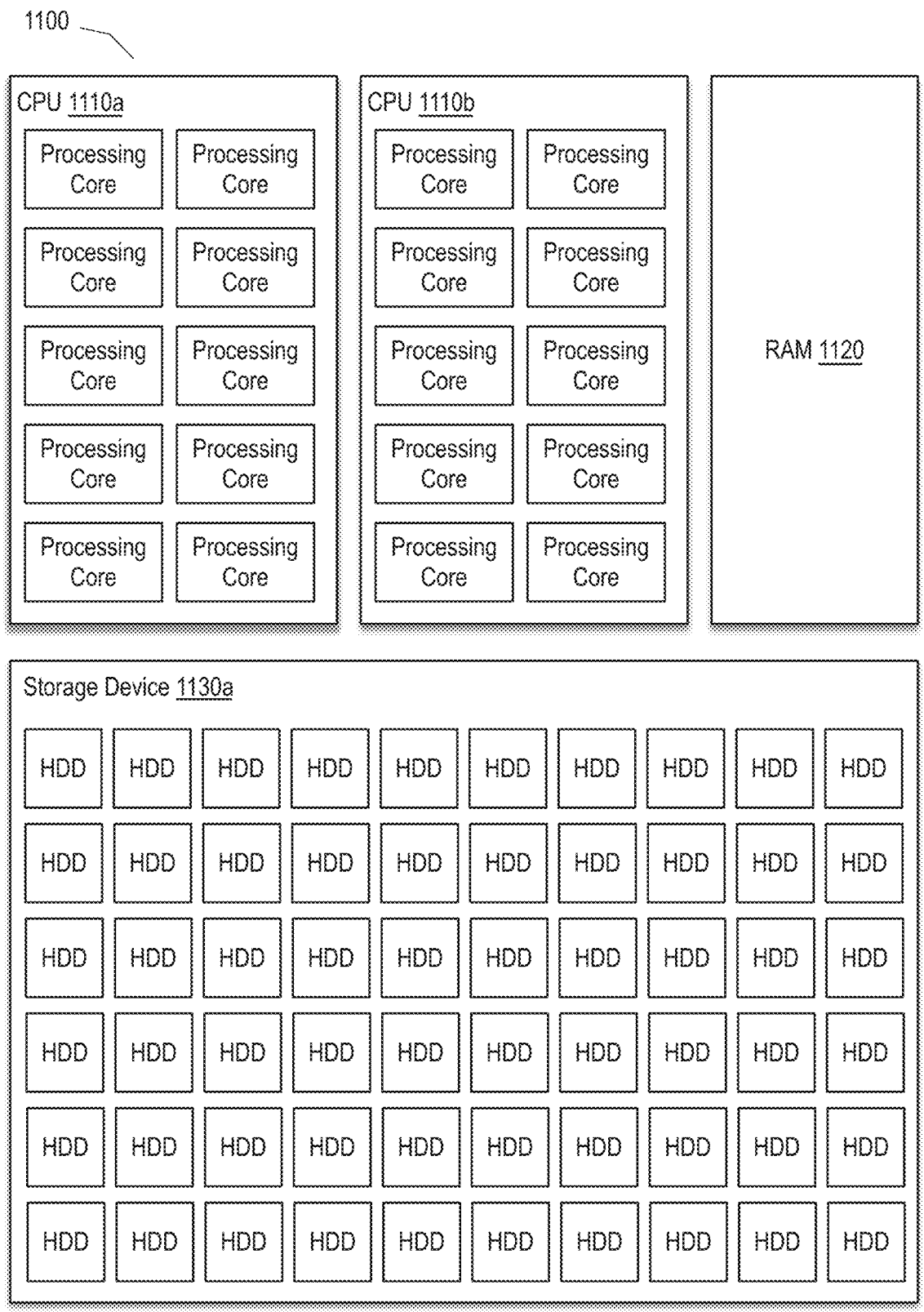
FIG. 11 shows a block diagram of an exemplary server on which an object store may be run.

FIG. 11 shows a block diagram of a server 1100 on which an object store may be run in accordance with an example embodiment. In the context of the present example, server 1100 may include at least two CPUs 1110*a-b*, each having at least ten processing cores. Server 1100 also may include at least 256 GB of RAM 1120, and a storage device 1130*a* having at least sixty hard disk drives (HDDs), for example, each including at least 14 TB of storage capacity. An HPE Apollo 4510 Gen10 high-density storage system produced by Hewlett Packard Enterprise Company is a non-limiting example of a storage system in which such a server architecture is achievable.

Figure 12:
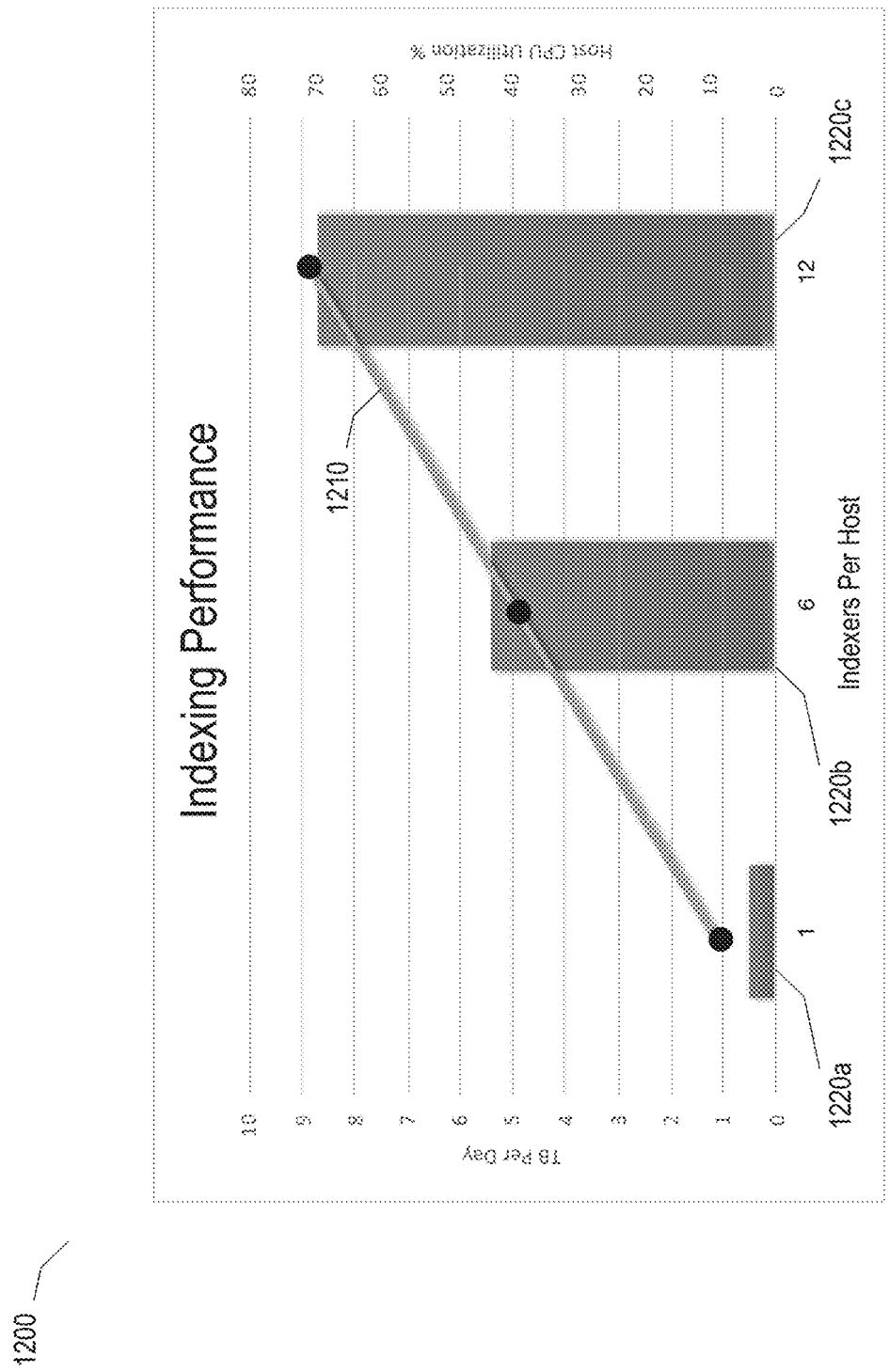
FIG. 12 shows a chart illustrating exemplary indexing performance.

FIG. 12 shows chart 1200 illustrating exemplary indexing performance. Indexing performance as shown in chart 1200 may be a similar metric to ingestion rate described above. The indexing performance data shown in chart 1200 is based on testing of a host (e.g., a server 1000) configured as substantially as described above with reference to FIG. 10 under at least three scenarios while concurrently subjecting the host to search requests. The first scenario involved running a single instance of an indexer (e.g., one of indexer applications 237a-b) on the host, the second scenario involved running six instances of the indexer on the host, and the third scenario involved running twelve instances of the indexer on the host. The resulting experimental data is represented in chart 1200.

Chart 1200 includes bars 1220a-c showing a rate of event data ingestion (e.g., in TB per day) or each of the three scenarios, and a line 1210 illustrating host CPU utilization for each of the three scenarios. In the first scenario, the single indexer ingested event data at a rate of 500 GB per day while utilizing ten percent of the host CPU. In the second scenario, the six indexers ingested event data at a rate of 5.4 TB per day while utilizing thirty-seven percent of the host CPU. In the third scenario, the twelve indexers ingested at a rate of 8.7 TB per day while utilizing sixty-eight percent of the host CPU. As such, an unexpected seventeen fold ingestion-rate improvement was observed when increasing the number of indexers between the first scenario (representing a baseline scenario) and the third scenario from one to twelve.

Figure 13:
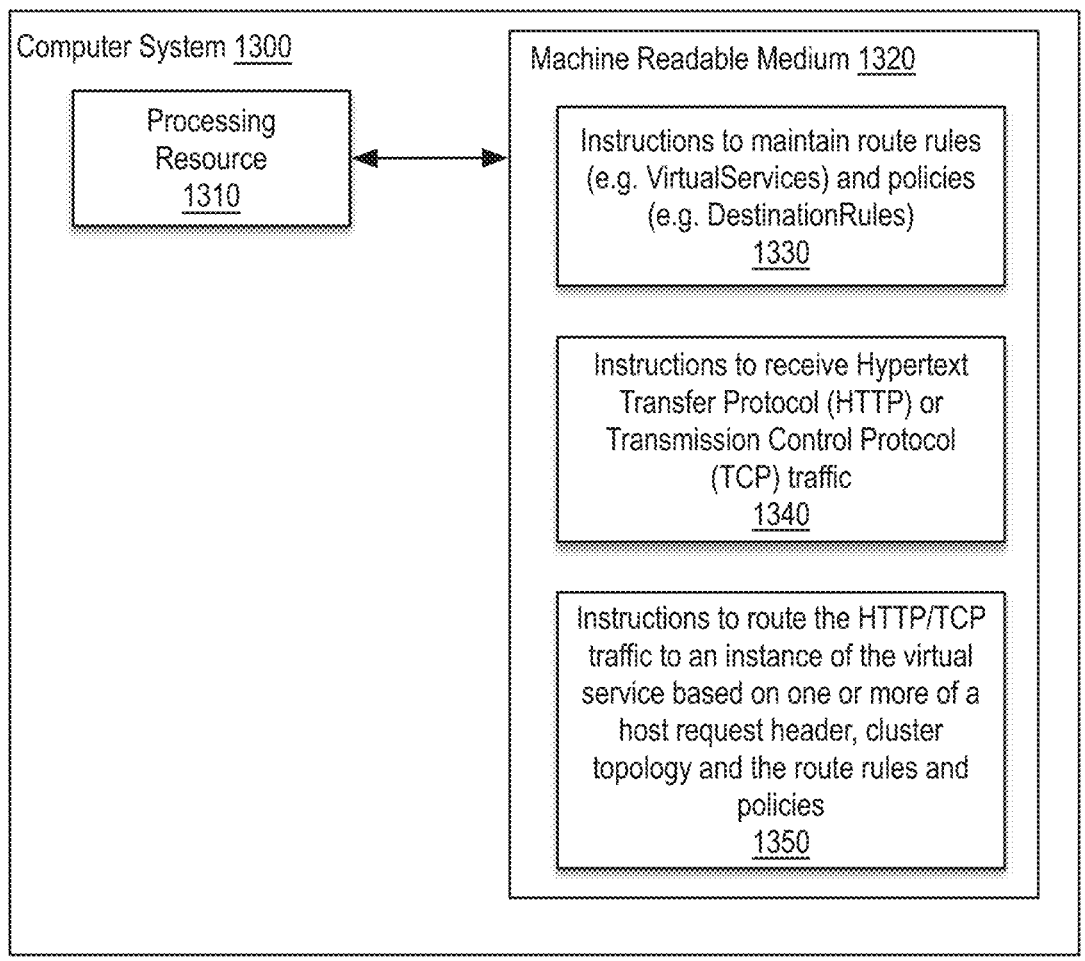
FIG. 13 shows a block diagram of an exemplary computer system.

FIG. 13 shows a block diagram of a computer system in accordance with an embodiment. In the example illustrated by FIG. 13, computer system 1300 includes processing resource 1310 coupled to non-transitory, machine readable medium 1320 encoded with instructions to perform a private cloud gateway creation processing. Processing resource 1310 may include a microcontroller, a microprocessor, CPU core(s), GPU core(s), an ASIC, an FPGA, and/or other hardware device suitable for retrieval and/or execution of instructions from machine readable medium 1320 to perform the functions related to various examples described herein. Additionally or alternatively, processing resource 1310 may include electronic circuitry for performing the functionality of the instructions described herein.

Machine readable medium 1320 may be any medium suitable for storing executable instructions. Non-limiting examples of machine readable medium 1320 include RAM, ROM, EEPROM, flash memory, a hard disk drive, an optical disc, or the like. Machine readable medium 1320 may be disposed within computer system 1300, as shown in FIG. 13, in which case the executable instructions may be deemed "installed" or "embedded" on computer system 1300. Alternatively, machine readable medium 1320 may be a portable (e.g., external) storage medium, and may be part of an "installation package." The instructions stored on machine readable medium 1320 may be useful for implementing at least part of the methods described herein.

In the context of the present example, machine readable medium 1320 is encoded with a set of executable instructions 1330-1350. It should be understood that part or all of the executable instructions and/or electronic circuits included within one block may, in alternate implementations, be included in a different block shown in the figures or in a different block not shown.

Instructions 1330, upon execution, may cause processing resource 1310 to maintain route rules (e.g. VirtualServices) and policies (e.g. DestinationRules). In one embodiment, instructions 1330 may be useful for performing block 910 of FIG. 9.

Instructions 1340, upon execution, may cause processing resource 1310 to receive Hypertext Transfer Protocol (HTTP) or Transmission Control Protocol (TCP) traffic. In one embodiment, instructions 1340 may be useful for performing decision block 920 of FIG. 9.

Instructions 1350, upon execution, may cause processing resource 1310 to route the HTTP/TCP traffic to an instance of the virtual service based on one or more of a host request header, cluster topology and the route rules and policies. In one embodiment, instructions 1330 may be useful for performing block 930 of FIG. 9.

In the foregoing description, numerous details are set forth to provide an understanding of the subject matter disclosed herein. However, implementation may be practiced without some or all of these details. Other implementations may include modifications, combinations, and variations of the details discussed above. It is intended that the following claims cover such modifications, combinations, and variations.

What is claimed is:

1. A method comprising:
configuring a subset of a plurality of hosts that are part of a stretch cluster spanning a plurality of data centers as service mesh hosts for hosting a service mesh;
executing a command on each host of the subset of the plurality of hosts to preclude the subset of the plurality of hosts from executing portions of a Security Information and Event Management (SIEM) application other than a plurality of containerized ingress gateways;
installing the plurality of containerized ingress gateways on the subset of the plurality of hosts, wherein each host of the subset of the plurality of hosts has installed at least one of the plurality of containerized ingress gateways;
maintaining, by an ingress gateway of the plurality of containerized ingress gateways running on the subset of the plurality of hosts that are the part of the stretch cluster spanning the plurality of data centers, route rules and policies for routing traffic to a plurality of virtual services associated with the SIEM application that are available within the stretch cluster spanning the plurality of data centers;
receiving, by the ingress gateway, traffic indicative of a particular virtual service of the plurality of virtual services, wherein:
the particular virtual service comprises an indexer service,
a plurality instances of an indexer component of the indexer service are deployed on a host, of the plurality of hosts, that is separate from the subset of the plurality of hosts, and
a quantity of the plurality of instances of the indexer component deployed on the host is selected to increase an ingestion rate of the host; and
routing, by the ingress gateway, the traffic to an instance of the plurality of instances of the indexer component based on one of more of a topology of the stretch cluster, and the route rules and policies.

2. The method of claim 1, wherein the traffic comprises a Hypertext Transfer Protocol (HTTP) request including a host request header containing information indicative of the particular virtual service, and wherein said routing comprises routing the HTTP request to an instance of the particular virtual service based on the host request header.

3. The method of claim 2, wherein the information indicative of the particular virtual service comprises a Fully Qualified Domain Name (FQDN).

4. The method of claim 2, wherein the HTTP request is generated by a source system based on a Domain Name System (DNS) response received from a network load balancer that load balances requests relating to the SIEM application among the plurality of containerized ingress gateways.

5. The method of claim 1, wherein multiple instances of the plurality of virtual services are running on each host of a second subset of the plurality of hosts.

6. The method of claim 1, wherein said routing comprises selecting an instance of the plurality of instances of the indexer component based further on a locality-based load balancing algorithm.

7. The method of claim 1, wherein each ingress gateway of the plurality of containerized ingress gateways exposes a fixed Internet Protocol (IP) address.

8. The method of claim 1, wherein the indexer service is operable to index large volume machine-generated data.

9. The method of claim 1, wherein another virtual service of the plurality of virtual services is operable to direct a received search request to a set of search peers and return a result representing a merger of results provided by the set of search peers.

* * * * *